United States Patent
Malina et al.

(10) Patent No.: US 10,926,955 B1
(45) Date of Patent: Feb. 23, 2021

(54) FINGER GUARD MEMBER AND FINGER GUARD MEMBER COUPLING STRUCTURE

(71) Applicant: KYOWA MANUFACTURING CO., LTD., Hyogo (JP)

(72) Inventors: Georg Helmut Malina, Duesseldorf (DE); Takashi Furui, Himeji (JP); Ryo Yoneda, Akashi (JP); Shinya Yamamoto, Ono (JP)

(73) Assignee: KYOWA MANUFACTURING CO., LTD., Hyogo (JP)

( * ) Notice: Subject to any disclaimer, the term of this patent is extended or adjusted under 35 U.S.C. 154(b) by 0 days.

(21) Appl. No.: 16/628,240

(22) PCT Filed: Dec. 27, 2018

(86) PCT No.: PCT/JP2018/048129
§ 371 (c)(1),
(2) Date: Jan. 2, 2020

(87) PCT Pub. No.: WO2020/136799
PCT Pub. Date: Jul. 2, 2020

(51) Int. Cl.
*B65G 13/07* (2006.01)
*B65G 13/11* (2006.01)

(52) U.S. Cl.
CPC ............ *B65G 13/11* (2013.01); *B65G 13/07* (2013.01)

(58) Field of Classification Search
USPC ........................ 198/618, 779, 780
See application file for complete search history.

(56) References Cited

U.S. PATENT DOCUMENTS

| 1,846,390 A | * | 2/1932 | Groth ................... B65G 13/071 |
| | | | 198/787 |
| 2,827,153 A | * | 3/1958 | Olk ........................ B65G 13/12 |
| | | | 198/790 |

(Continued)

FOREIGN PATENT DOCUMENTS

| CN | 203382057 U | 1/2014 |
| DE | 42 11 874 A1 | 10/1993 |

(Continued)

OTHER PUBLICATIONS

The extended European search report issued by the European Patent Office dated Aug. 28, 2020, which corresponds to European Patent Application No. 18926380.9.

(Continued)

*Primary Examiner* — Joseph A Dillon, Jr.
(74) *Attorney, Agent, or Firm* — Studebaker & Brackett PC

(57) ABSTRACT

A finger guard member includes: a first surface disposed between one end of a roller and a belt wound around the one end; a second surface in which a notch having a width larger than a shaft diameter of a fixed shaft of the roller is formed with respect to the fixed shaft positioned outside the one end in a longitudinal direction of the roller; and a positioning part disposed inside the notch. When the fixed shaft has a first shaft diameter, the finger guard member is positioned by the positioning part being supported by a peripheral surface of the fixed shaft. When the fixed shaft has a second shaft diameter greater than the first shaft diameter, the finger guard member is positioned by an edge of the notch being supported by the peripheral surface of the fixed shaft with the positioning part being not present on the second surface.

8 Claims, 46 Drawing Sheets

(56) References Cited

U.S. PATENT DOCUMENTS

| | | | |
|---|---|---|---|
| 4,399,908 A | 8/1983 | Gunti | |
| 4,488,639 A | 12/1984 | Vogt et al. | |
| 5,040,669 A * | 8/1991 | Blocker | B65G 13/07 198/782 |
| 5,392,899 A * | 2/1995 | Wakabayashi | B65G 13/07 198/780 |
| 5,657,854 A * | 8/1997 | Chen | B65G 13/07 193/35 R |
| 6,158,574 A | 12/2000 | Williams et al. | |
| 6,805,234 B2 * | 10/2004 | Warnecke | B65G 13/08 198/781.09 |
| 7,882,944 B1 | 2/2011 | Eubanks et al. | |
| 8,196,736 B2 * | 6/2012 | Wagner | B65G 13/04 198/781.1 |
| 10,765,210 B2 * | 9/2020 | Laplace | B65G 1/02 |
| 2007/0034488 A1 * | 2/2007 | Chiu Chen | B65G 13/12 198/861.1 |
| 2015/0183583 A1 * | 7/2015 | Specht | B65G 39/12 198/790 |
| 2017/0334649 A1 * | 11/2017 | Ramezani | B65G 13/04 |
| 2018/0237226 A1 * | 8/2018 | Kacel | B65G 13/06 |
| 2020/0290814 A1 * | 9/2020 | Diehr | B65G 13/07 |
| 2020/0346868 A1 * | 11/2020 | K.S | B65G 39/09 |

FOREIGN PATENT DOCUMENTS

| | | |
|---|---|---|
| DE | 19931365 A1 | 1/2001 |
| EP | 1 714 917 A1 | 10/2006 |
| EP | 2 455 307 A1 | 5/2012 |
| JP | S53-131679 A | 11/1978 |

OTHER PUBLICATIONS

"What is Motor Roller" [online]; obtained on Mar. 29, 2017 through the webpage of MonotaRO Co., Ltd.; <URL: https://www.monotaro.com/s/pages/cocomite/787/>.

* cited by examiner

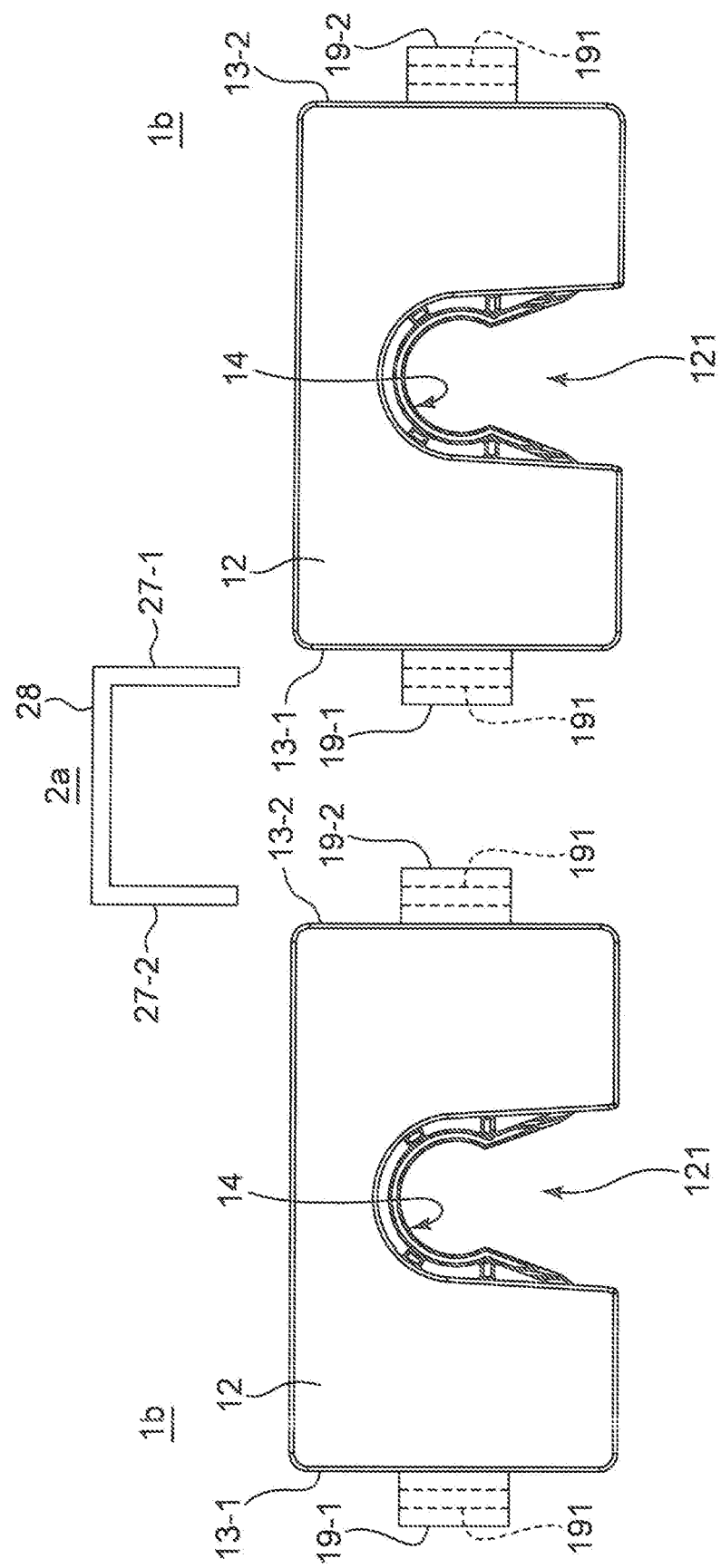

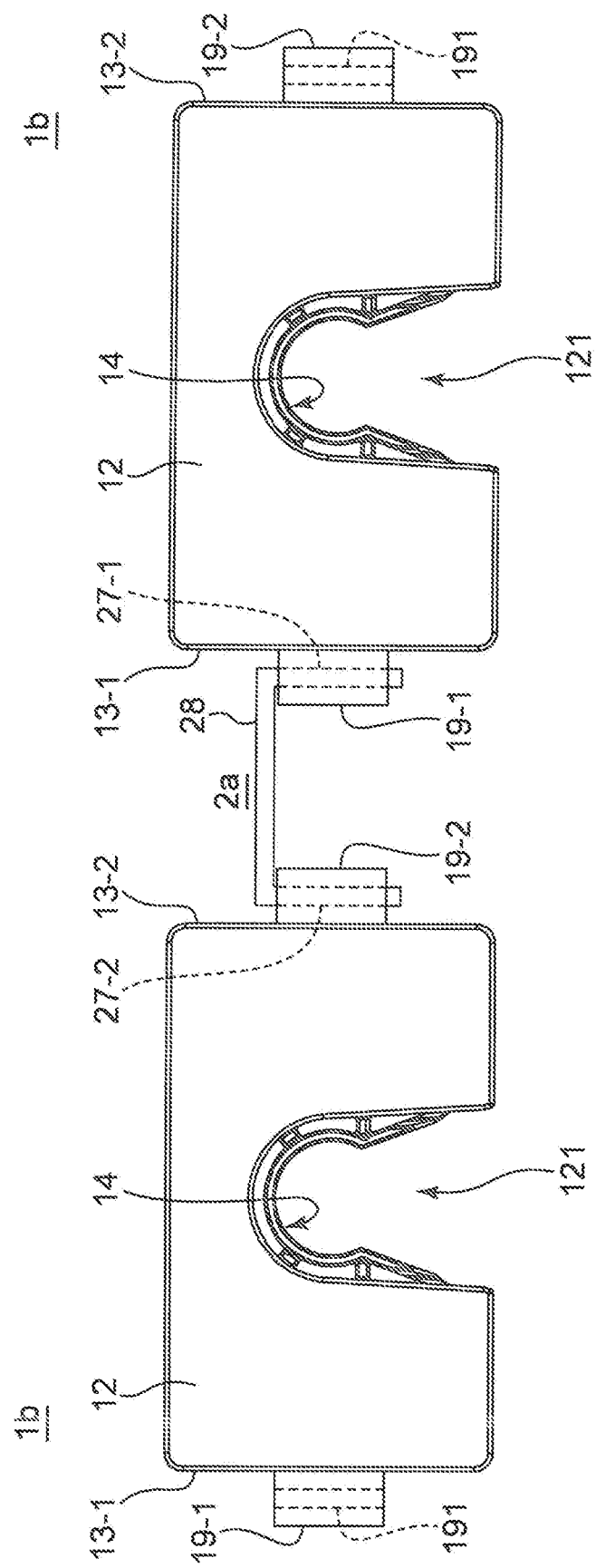

FINGER GUARD MEMBER AND FINGER GUARD MEMBER COUPLING STRUCTURE

TECHNICAL FIELD

The present invention relates to a finger guard member and a finger guard member coupling structure used in a roller conveyor.

BACKGROUND ART

A roller conveyor is used in a wide range of industrial fields such as distribution centers, clean rooms, food lines, general production lines, mail centers, and distribution centers.

One roller conveyor drive scheme is a scheme to rotate a roller by a motor built in the roller (hereinafter referred to as a motor roller scheme). A roller conveyor of this scheme is disclosed in Non Patent Literature 1, for example. In the roller conveyor disclosed in this literature, three rollers arranged at a predetermined pitch constitute one group. Each group includes one motor roller and two free rollers. A belt is wound between one end of a central roller (free roller) and one end of a left roller (motor roller), and a belt is wound between one end of the central roller (free roller) and one end of a right roller (free roller). When the motor roller itself rotates, the motor roller can transmit rotational force to the two free rollers to cause the two free rollers to rotate.

Due to carelessness of an operator, there is a possibility that a finger may be caught between the one end of the roller and the belt.

CITATION LIST

Non Patent Literature

Non Patent Literature 1: "What is motor roller", [online], [Searched on Dec. 12, 2018], Internet <URL: https://www.monotaro.com/s/pages/cocomite/787/>

SUMMARY OF INVENTION

An object of the present invention is to provide a finger guard member that prevents a finger from being caught between one end of a roller and a belt wound around the one end in a roller conveyor, and a finger guard member coupling structure using the same.

A finger guard member according to the present invention is a finger guard member for a roller conveyor, the finger guard member including: a first surface disposed between one end of a roller provided in the roller conveyor and a belt wound around the one end; a second surface in which a notch having a width larger than a shaft diameter of a fixed shaft of the roller is formed with respect to the fixed shaft positioned outside the one end in a longitudinal direction of the roller; and a positioning part disposed inside the notch. When the fixed shaft has a first shaft diameter, the finger guard member is positioned by the positioning part being supported by a peripheral surface of the fixed shaft. When the fixed shaft has a second shaft diameter greater than the first shaft diameter, the finger guard member is positioned by an edge of the notch being supported by the peripheral surface of the fixed shaft with the positioning part being not present on the second surface.

The above as well as additional objects, features, and advantages of the present invention will become apparent from the following detailed description and the accompanying drawings.

BRIEF DESCRIPTION OF DRAWINGS

FIG. 19A is a front view showing a relationship between a coupling member according to the modified example and a vicinity of insertion parts of the adjacent finger guard members.

FIG. 19B is a front view showing that the adjacent finger guard members in FIG. 19A are coupled by the coupling member according to the modified example.

DESCRIPTION OF EMBODIMENT

An embodiment of the present invention will be described in detail below with reference to the drawings. In each of the drawings, a component with the same reference sign indicates the same component, and descriptions of the component already described will be omitted. In this specification, when a component is generically called, the component is denoted with a reference sign with a hyphen omitted (for example, roller 31), whereas when an individual component is referred to, the component is denoted with a reference sign with a hyphen attached (for example, rollers 31-1 to 31-3).

Figure 1A:
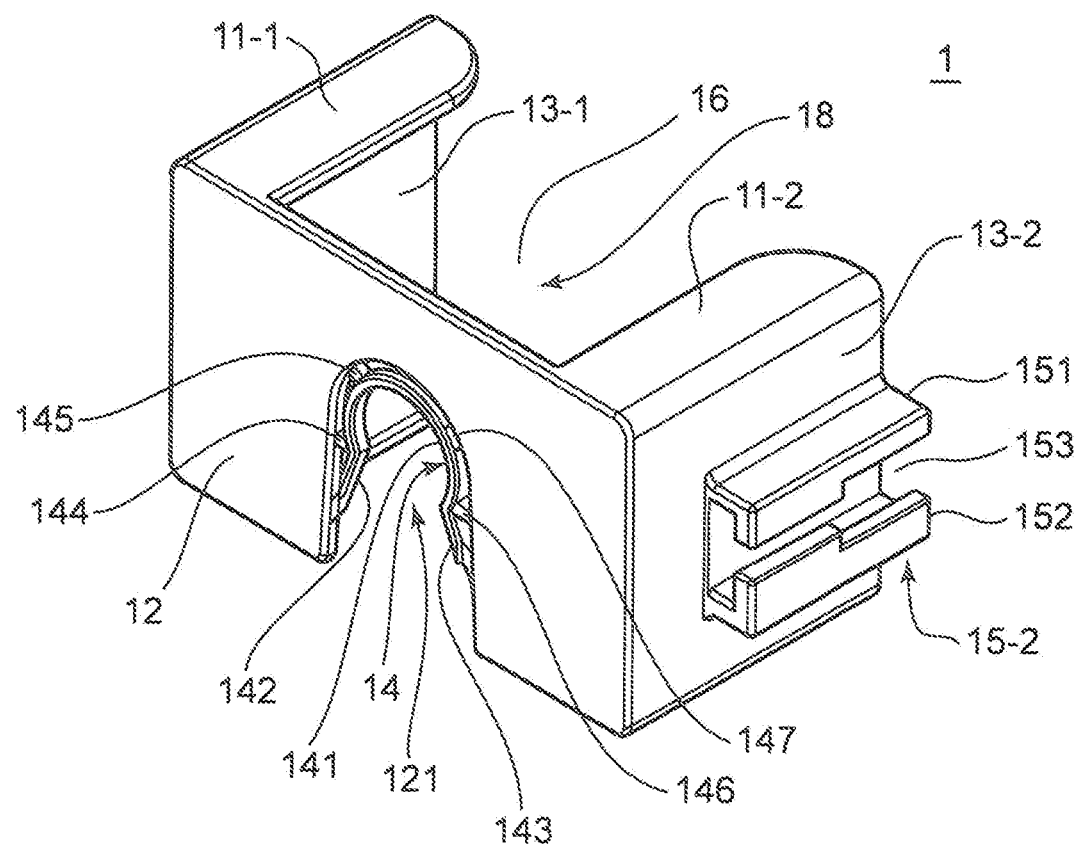
FIG. 1A is a front perspective view of a finger guard member according to an embodiment.
Figure 1B:
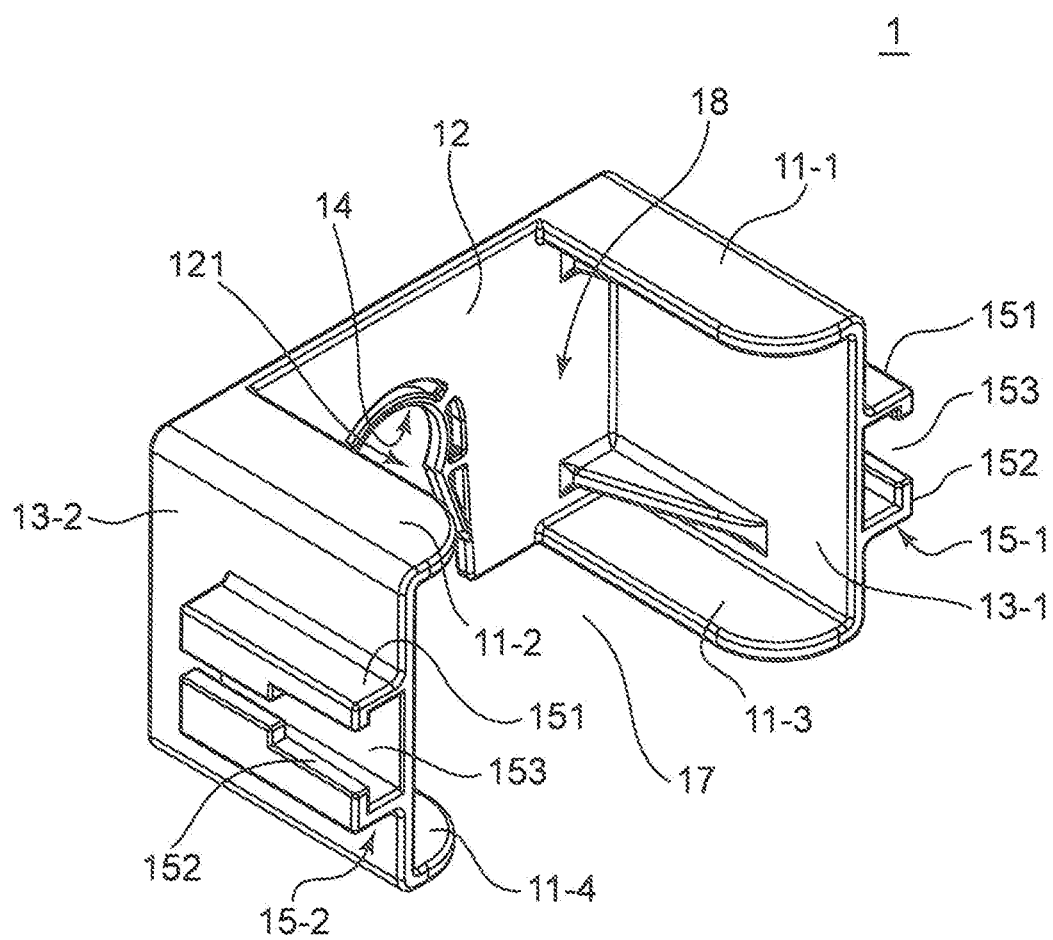
FIG. 1B is a rear perspective view of the finger guard member according to the embodiment.
Figure 1C:
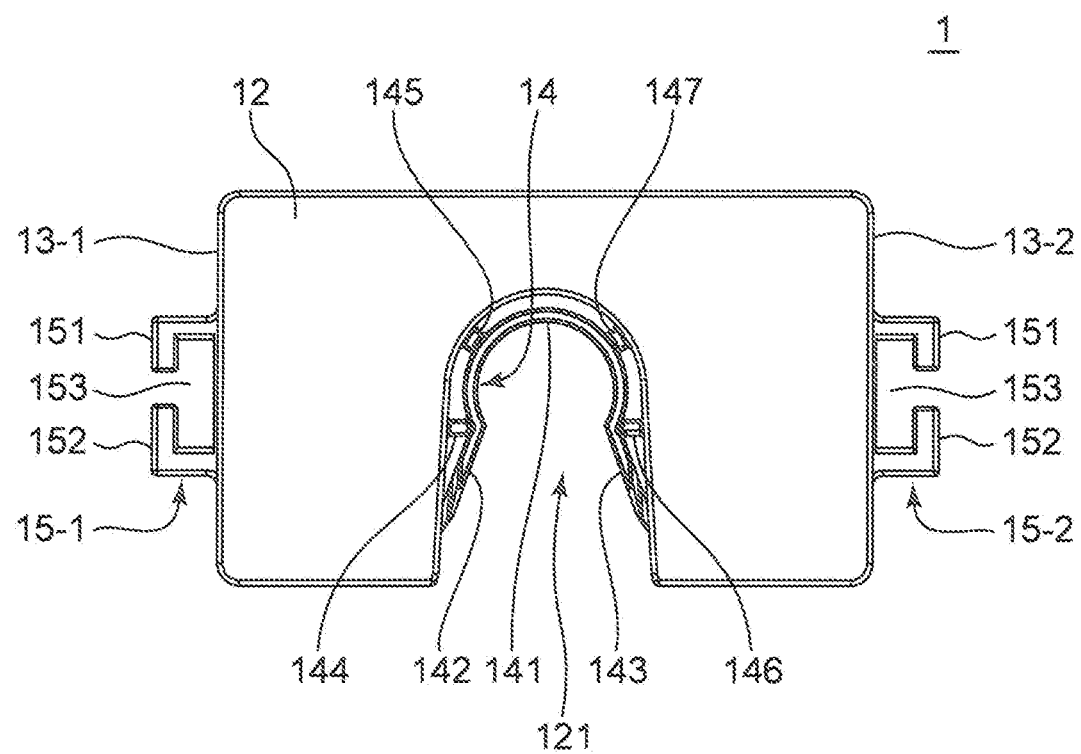
FIG. 1C is a front view of the finger guard member according to the embodiment.
Figure 1D:
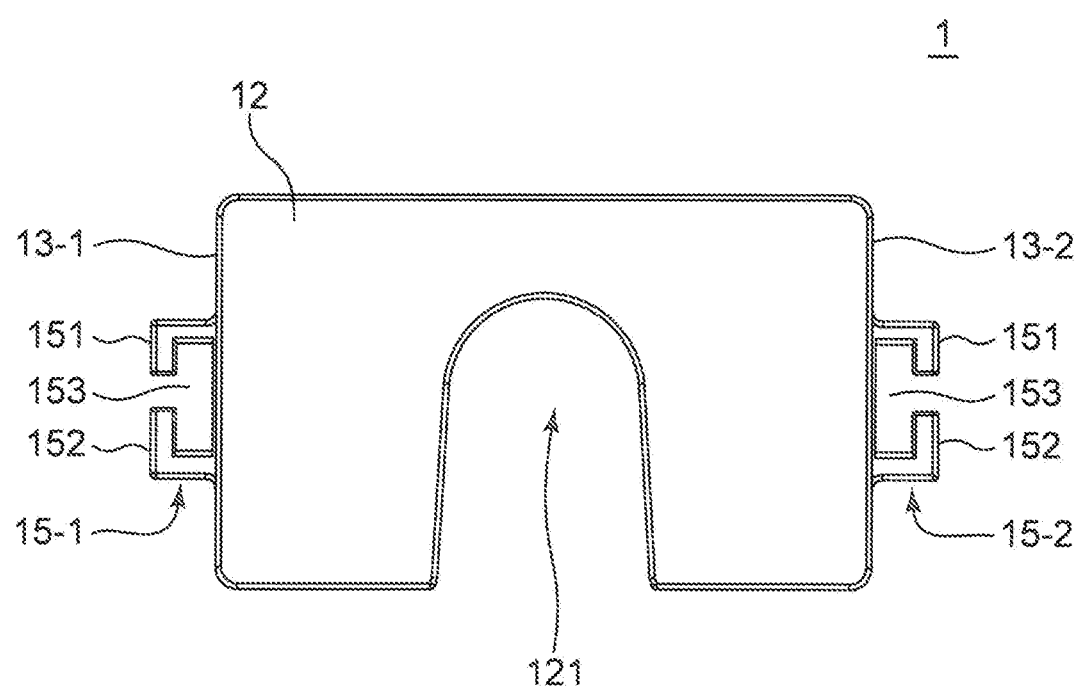
FIG. 1D is a front view of the finger guard member with a positioning part removed in FIG. 1C.

FIG. 1A is a front perspective view of a finger guard member 1 according to the embodiment. FIG. 1B is a rear perspective view of the finger guard member 1. FIG. 1C is a front view of the finger guard member 1. FIG. 1D is a front view of the finger guard member 1 with a positioning part 14 removed in FIG. 1C.

Figure 2A:
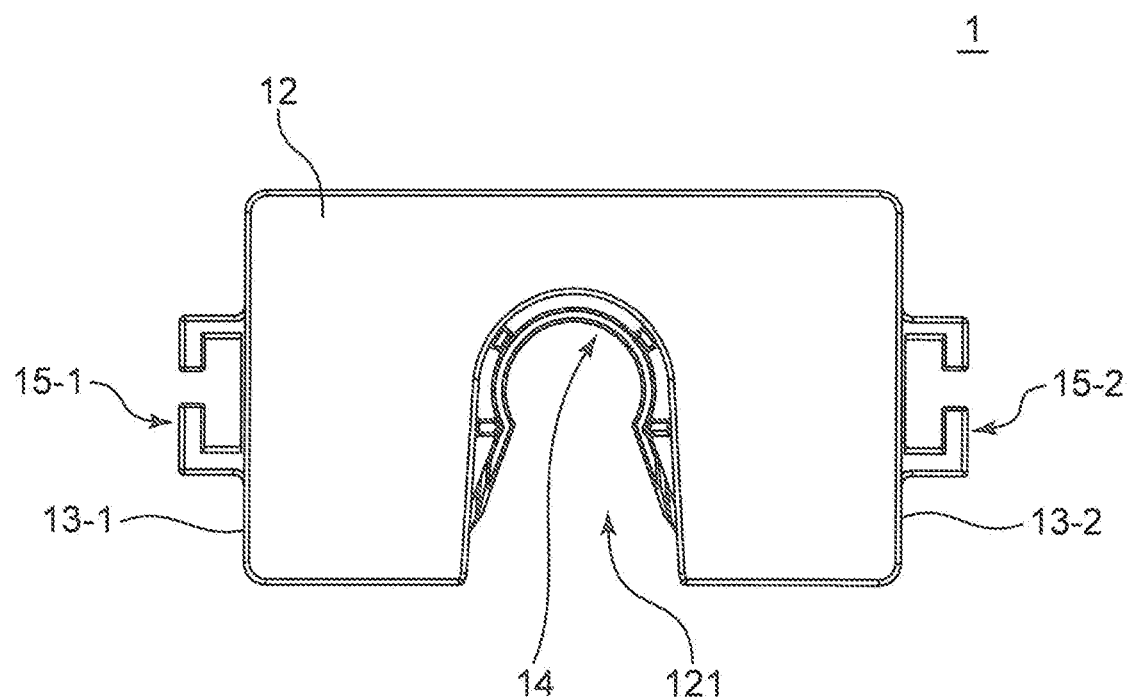
FIG. 2A is a front view of the finger guard member.
Figure 2B:
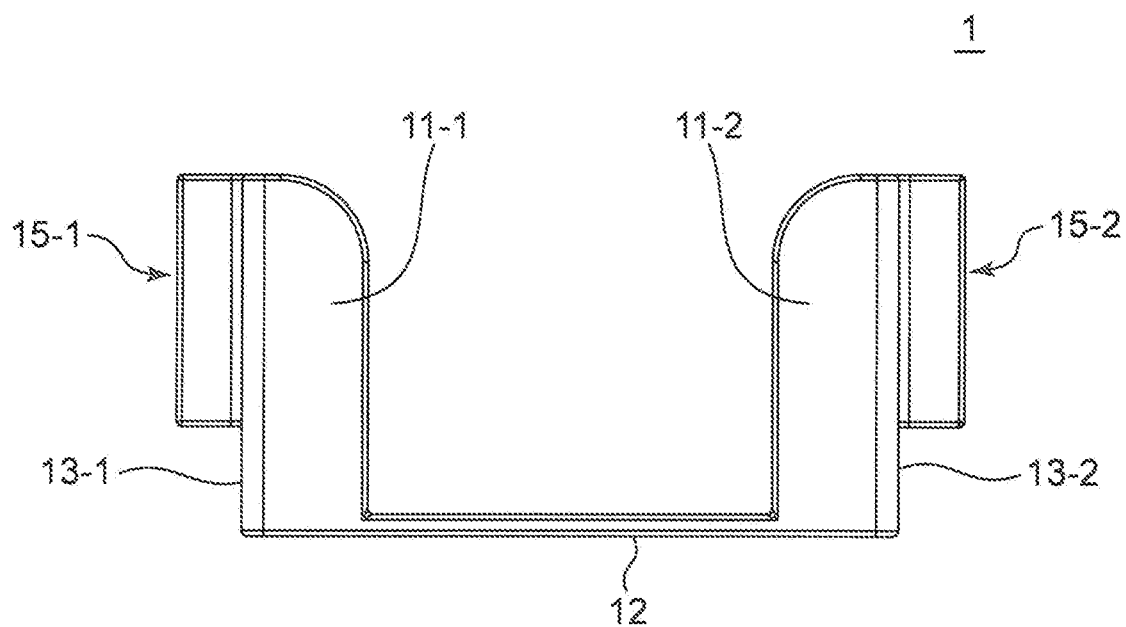
FIG. 2B is a top view of the finger guard member.
Figure 2C:
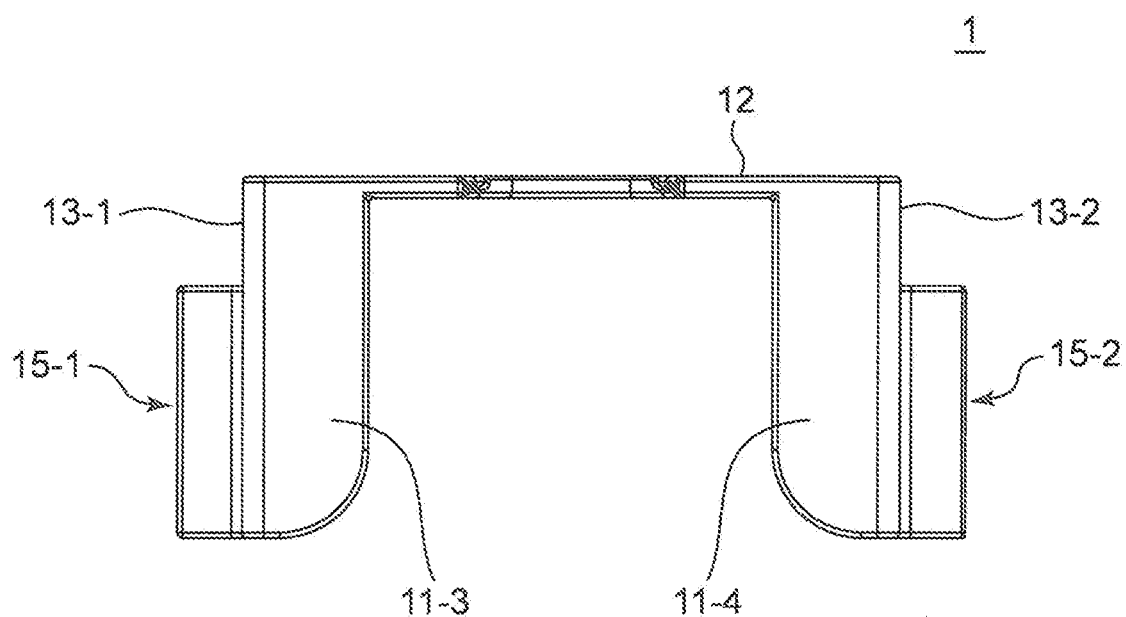
FIG. 2C is a bottom view of the finger guard member.
Figure 2D:
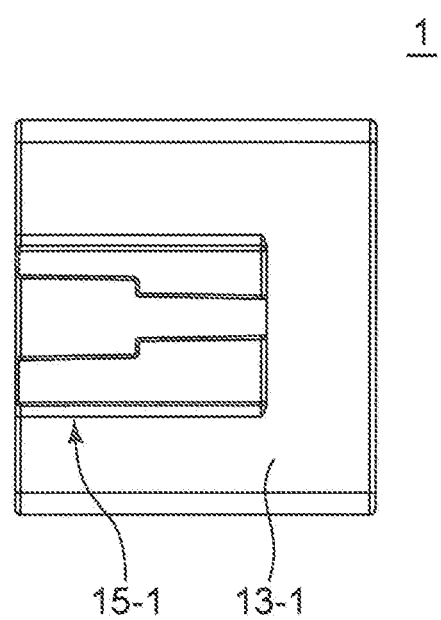
FIG. 2D is a left side view of the finger guard member.
Figure 2E:
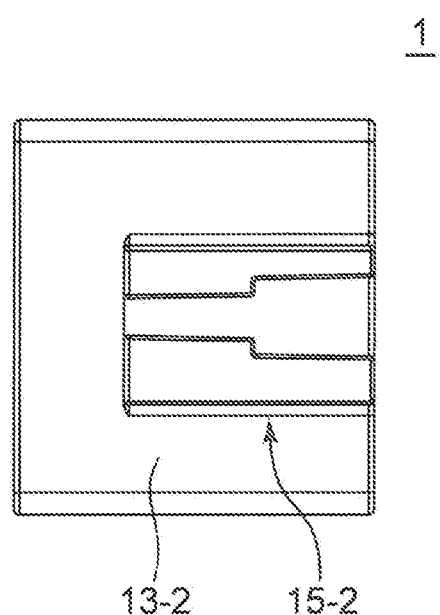
FIG. 2E is a right side view of the finger guard member.
Figure 2F:
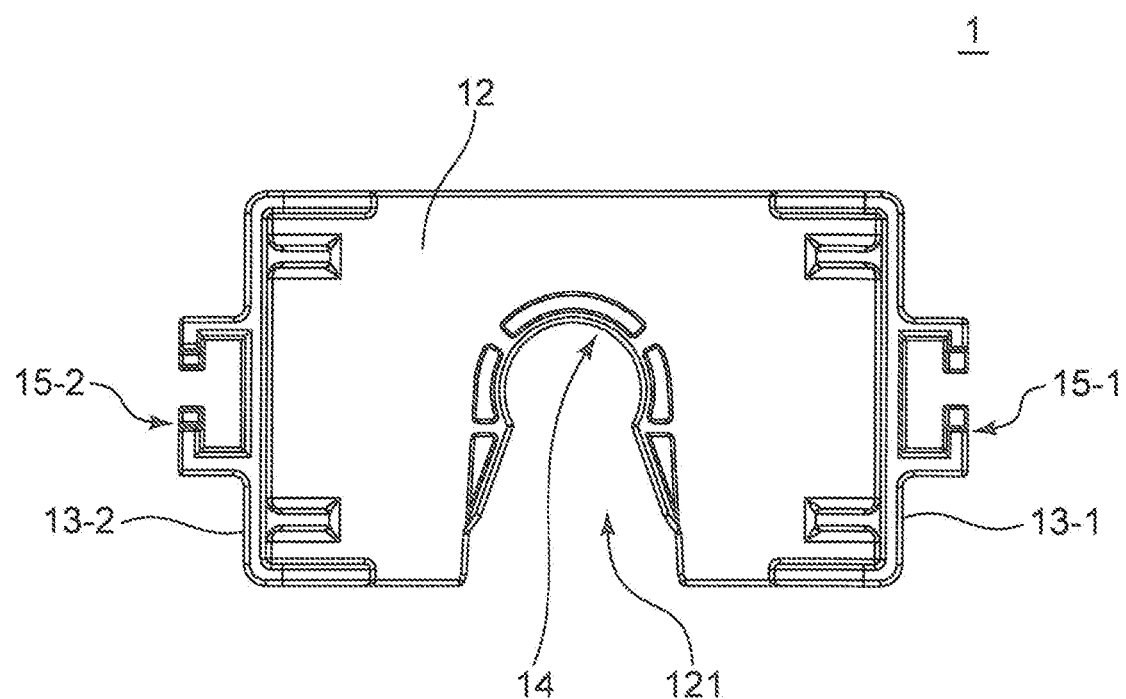
FIG. 2F is a rear view of the finger guard member.

FIGS. 2A to 2F are six views of the finger guard member 1. FIG. 2A is a front view of the finger guard member 1. FIG. 2B is a top view of the finger guard member 1. FIG. 2C is a bottom view of the finger guard member 1. FIG. 2D is a left side view of the finger guard member 1. FIG. 2E is a right side view of the finger guard member 1. FIG. 2F is a rear view of the finger guard member 1.

Figure 3:
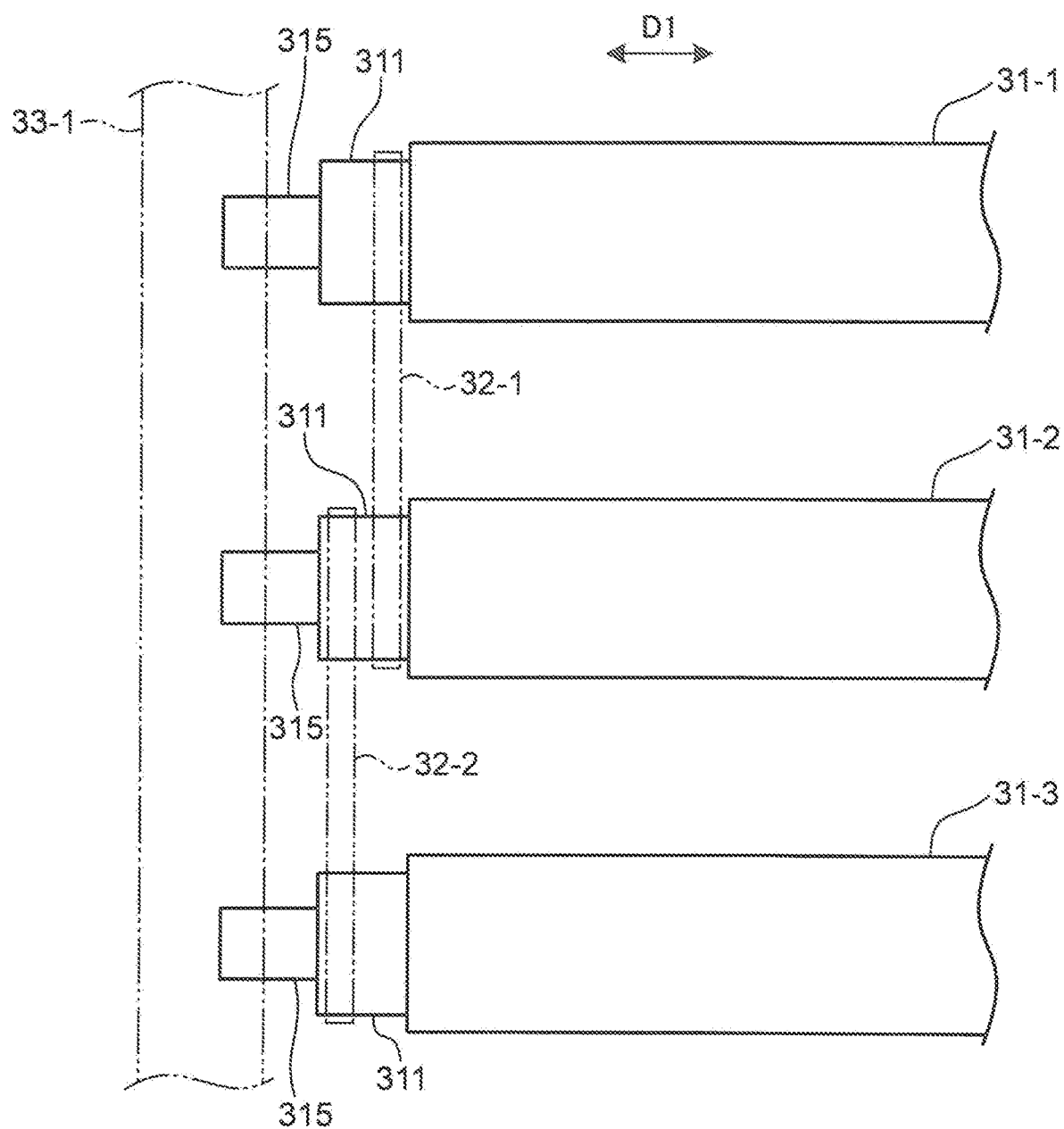
FIG. 3 is a schematic view near one ends of three rollers of rollers provided in a roller conveyor.
Figure 4A:
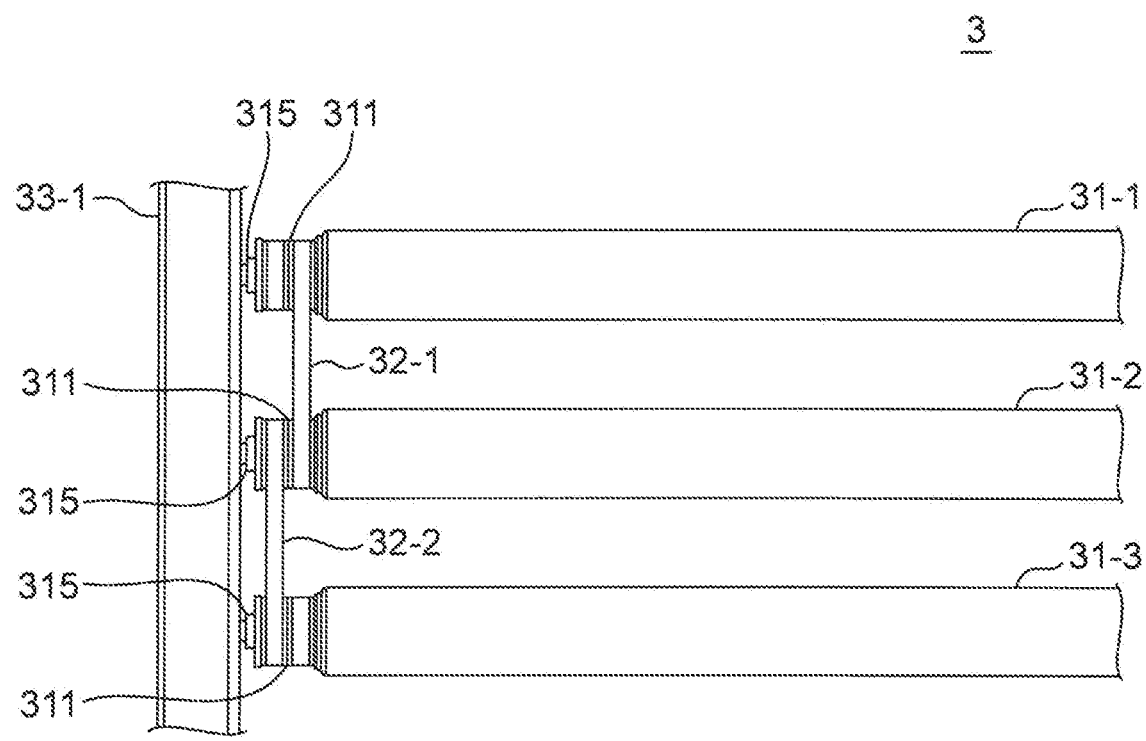
FIG. 4A is a plan view near the one ends of the three rollers with the finger guard members not installed in the roller conveyor.
Figure 4B:
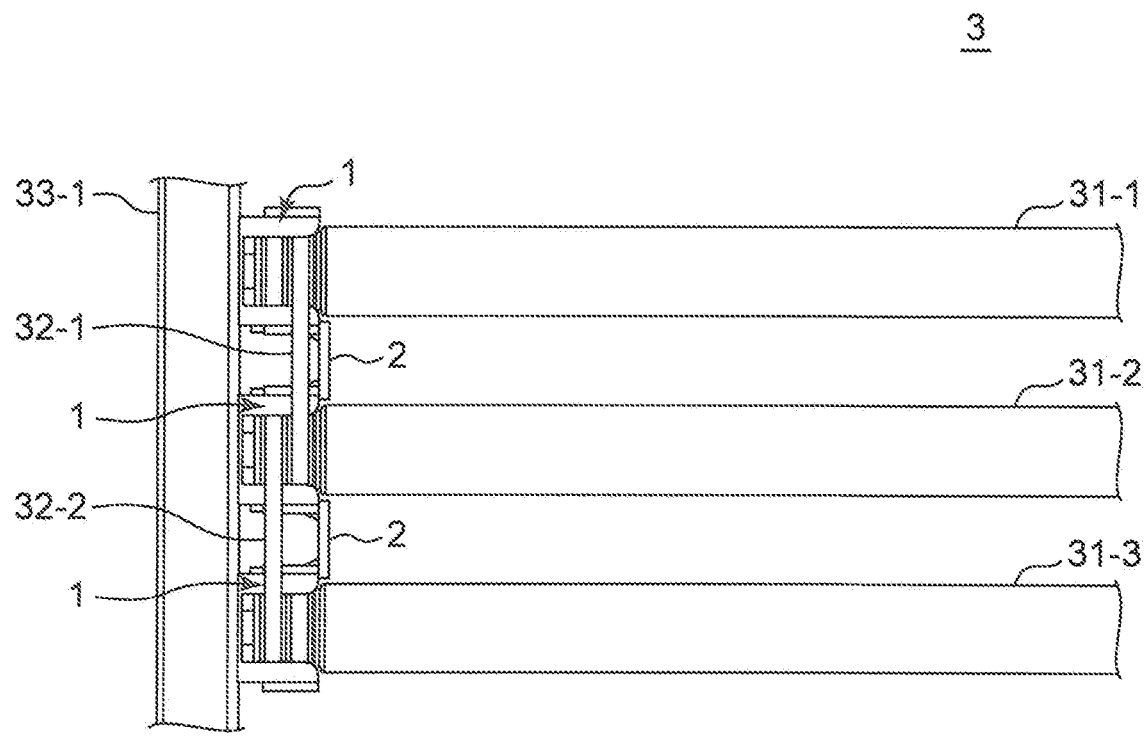
FIG. 4B is a plan view near the one ends of the three rollers with the finger guard members installed in the roller conveyor.

FIG. 3 is a schematic view near one ends 311 of three rollers 31-1 to 31-3 of rollers 31 provided in a roller conveyor 3. FIG. 4A is a plan view near the one ends 311 of the three rollers 31-1 to 31-3 with the finger guard members 1 not installed in the roller conveyor 3. FIG. 4B is a plan view near the one ends 311 of the three rollers 31-1 to 31-3 with the finger guard members 1 installed in the roller conveyor 3.

With reference to FIGS. 3, 4A, and 4B, the roller 31 is either a motor roller or a free roller. The roller 31-1 and the roller 31-3 are disposed adjacently to both sides of the roller 31-2. A belt 32 is wound around the one end 311 of the roller 31 in a longitudinal direction D1. In more detail, a belt 32-1 is wound between the one end 311 of the roller 31-1 and the one end 311 of the roller 31-2. A belt 32-2 is wound between the one end 311 of the roller 31-2 and the one end 311 of the roller 31-3.

The roller 31 includes a fixed shaft 315 positioned outside the one end 311 in the longitudinal direction D1. The roller 31 including the one end 311 can rotate about the fixed shaft 315. A frame 33-1 of the roller conveyor 3 is disposed outside the fixed shaft 315 in the longitudinal direction D1. The roller 31 is rotatably supported by the frame 33-1 disposed on the one end 311 side and a frame (not shown) disposed on the other end side. A detailed description will be provided. A method of the support differs depending on whether a shaft diameter of the fixed shaft 315 is a first shaft diameter (for example, 12 mm) or a second shaft diameter (for example, 17 mm) that is larger than the first shaft diameter. For the first shaft diameter, the fixed shaft 315 is passed through a through hole (not shown) formed in the frame 33-1, and a tip portion of the fixed shaft 315 protrudes from the through hole. The fixed shaft 315 is supported by an edge of the through hole and is not fixed to the frame 33-1. A fixed shaft (not shown) on the other end side of the roller 31 is fixed to the frame disposed on the other end side. FIG. 3 shows a case of the first shaft diameter. In contrast, for the second shaft diameter, since the second shaft diameter is larger than the through hole formed in the frame 33-1, the fixed shaft 315 cannot be passed through the through hole. Therefore, the fixed shaft 315 cannot be supported by the edge of the through hole. Therefore, the fixed shaft 315 is supported by tightening a bolt (not shown) passed through the through hole to a tap (not shown) formed on the fixed shaft 315.

Each of the finger guard members 1 is installed in the roller conveyor 3. In more detail, at the fixed shaft 315, the finger guard member 1 is installed at a position between the one end 311 and the frame 33-1.

The finger guard member 1 will be described with reference to FIGS. 1A to 1D and 3. Note that in order to facilitate understanding of FIGS. 1A to 1D, reference is made to FIGS. 2A to 2F as necessary. The finger guard member 1 includes a first surface 11, a second surface 12, a third surface 13, a positioning part 14, and fitting parts 15. The finger guard member 1 is produced by metal molding or a three-dimensional printer. These components of the finger guard member 1 are integrally formed.

When the second surface 12 is defined as a front surface of the finger guard member 1, the third surface 13 is a side surface of the finger guard member 1. There is no surface on a rear side of the finger guard member 1. An opening 16 is formed on an upper surface side of the finger guard member 1 with both side parts of the upper surface remained. The both side parts are first surfaces 11-1 and 11-2. An opening 17 is formed on a lower surface side of the finger guard member 1 with both side parts of the lower surface remained. The both side parts are first surfaces 11-3 and 11-4. The first surface 11, the second surface 12, and the third surface 13 form a space 18 in which the one end 311 of the roller 31 is housed.

A fitting part 15-1 (first fitting part) is formed on a third surface 13-1. A fitting part 15-2 (second fitting part) is formed on a third surface 13-2. The fitting part 15 is used for coupling the adjacent finger guard members 1.

A notch 121 is formed in the center of the second surface 12. In more detail, the notch 121 has an arch shape. A shape of a tip portion of the notch 121 (tip end of the arch) is an arc shape. A width of the notch 121 is larger than the shaft diameter of the fixed shaft 315.

When the finger guard member 1 is installed at the one end 311 (in other words, when the finger guard member 1 is installed in the roller conveyor 3), the finger guard member 1 is positioned using the fixed shaft 315. Here, the finger guard member 1 is positioned in two directions (in other words, a direction in which the rollers 31 are arranged and a vertical direction of the finger guard member 1) orthogonal to the longitudinal direction D1 of the roller 31 (in other words, axial direction of the fixed shaft 315). A method of the positioning differs depending on whether the shaft diameter of the fixed shaft 315 is the first shaft diameter or the second shaft diameter larger than the first shaft diameter. For the first shaft diameter, the positioning part 14 is used.

Figure 5:
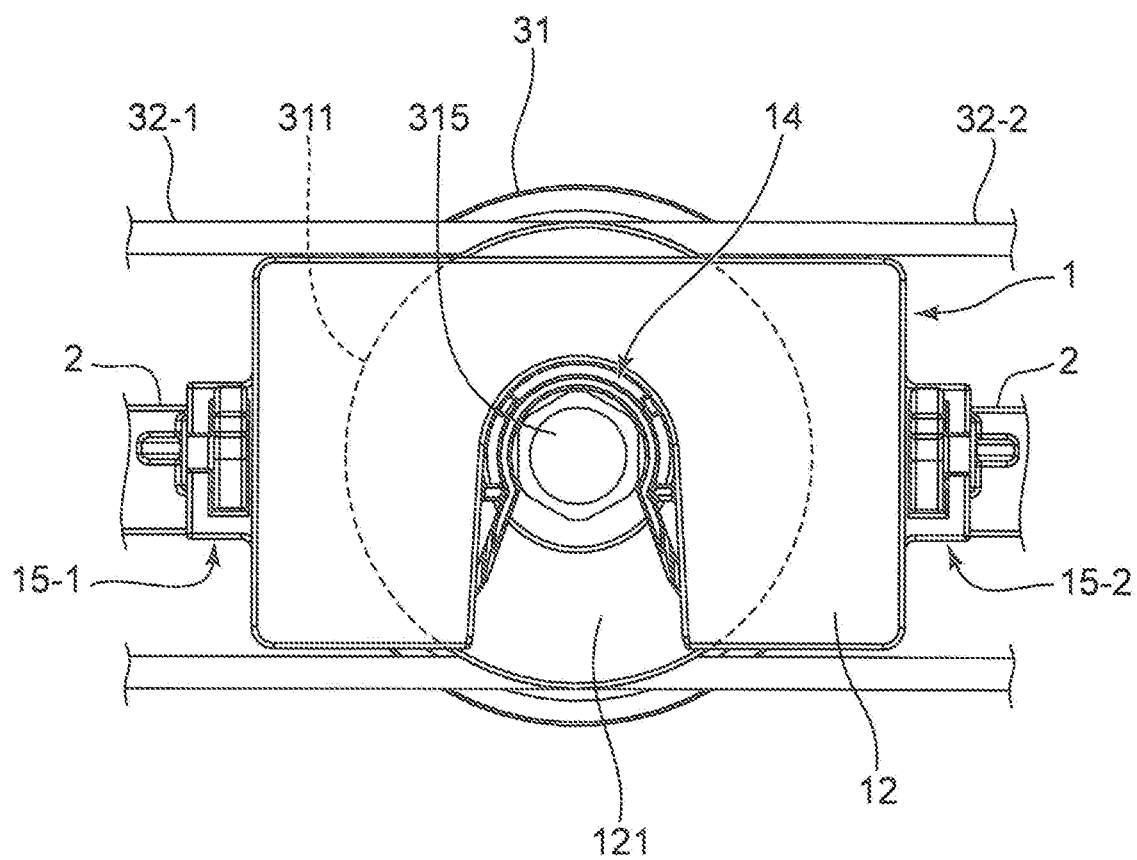
FIG. 5 is a front view of the finger guard member installed at the one end when a fixed shaft has a first shaft diameter.

The positioning part 14 is formed integrally with the second surface 12 and is disposed inside the notch 121. When the fixed shaft 315 has the first shaft diameter, the finger guard member 1 is positioned by the positioning part 14 being supported by a peripheral surface of the fixed shaft 315. A detailed description will be provided. FIG. 5 is a front view of the finger guard member 1 installed at the one end 311 when the fixed shaft 315 has the first shaft diameter. With reference to FIG. 5 as well, the positioning part 14 (FIG. 1C) includes an arc-shaped part 141, guide parts 142 and 143, and rib parts 144 to 147. An arc indicated by the arc-shaped part 141 is larger than a semicircle. When the fixed shaft 315 has the first shaft diameter, the finger guard member 1 is positioned by the arc-shaped part 141 being supported by the peripheral surface of the fixed shaft 315.

A double radius of the arc-shaped part 141 is almost the same as the first shaft diameter. Accordingly, for the first shaft diameter, the finger guard member 1 is positioned with the fixed shaft 315 being fitted into the arc-shaped part 141. A distance between both ends of the arc-shaped part 141 is smaller than the first shaft diameter. This makes it possible to prevent the finger guard member 1 from easily coming off the fixed shaft 315 with the finger guard member 1 being positioned.

A tip end of the guide part 142 (first guide part) is connected to one of the both ends of the arc-shaped part 141, and the guide part 142 guides the fixed shaft 315 to the arc-shaped part 141. A tip end of the guide part 143 (second guide part) is connected to the other of the both ends of the arc-shaped part 141, and the guide part 143 guides the fixed shaft 315 to the arc-shaped part 141. A proximal end of the guide part 142 is connected to one side part of the arch (edge of the notch 121) at a lower portion of the notch 121 having an arch shape. A proximal end of the guide part 143 is connected to the other side part of the arch (edge of the notch 121) at a lower portion of the notch 121 having an arch shape.

The fixed shaft 315 is guided by the guide part 142 and the guide part 143, and fitted into the arc-shaped part 141. Since an interval between the guide part 142 and the guide part 143 is shortened toward the arc-shaped part 141, even if the distance between the both ends of the arc-shaped part 141 is smaller than the first shaft diameter, the fixed shaft 315 can be easily fitted into the arc-shaped part 141.

When the second surface 12 is viewed from the front, the rib parts 144 and 145 are disposed between a left side of the notch 121 and the arc-shaped part 141, and the rib parts 146 and 147 are disposed between a right side of the notch 121 and the arc-shaped part 141. The rib part 144 connects one of the both ends of the arc-shaped part 141 to the edge of the notch 121. The rib part 146 connects the other of the both ends of the arc-shaped part 141 to the edge of the notch 121. The rib parts 145 and 147 are positioned between the rib part 144 and the rib part 146. The rib part 145 connects the arc-shaped part 141 to the edge of the notch 121 on the left side of the notch 121. The rib part 147 connects the arc-shaped part 141 to the edge of the notch 121 on the right side of the notch 121.

Figure 6A:
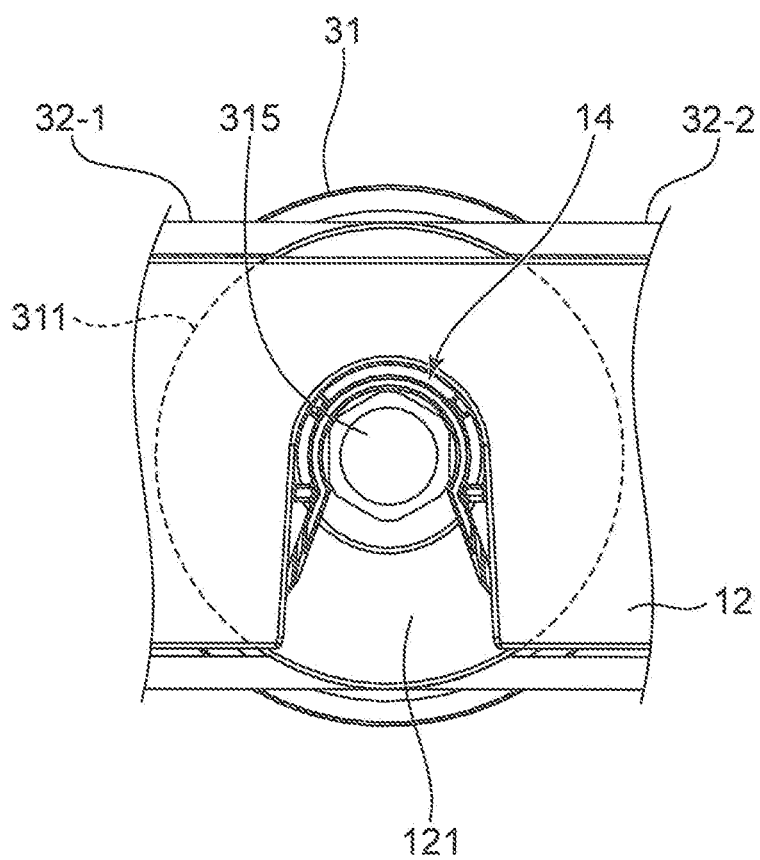
FIG. 6A is a front view of the finger guard member installed at the one end when a hexagonal fixed shaft has the first shaft diameter.
Figure 6B:
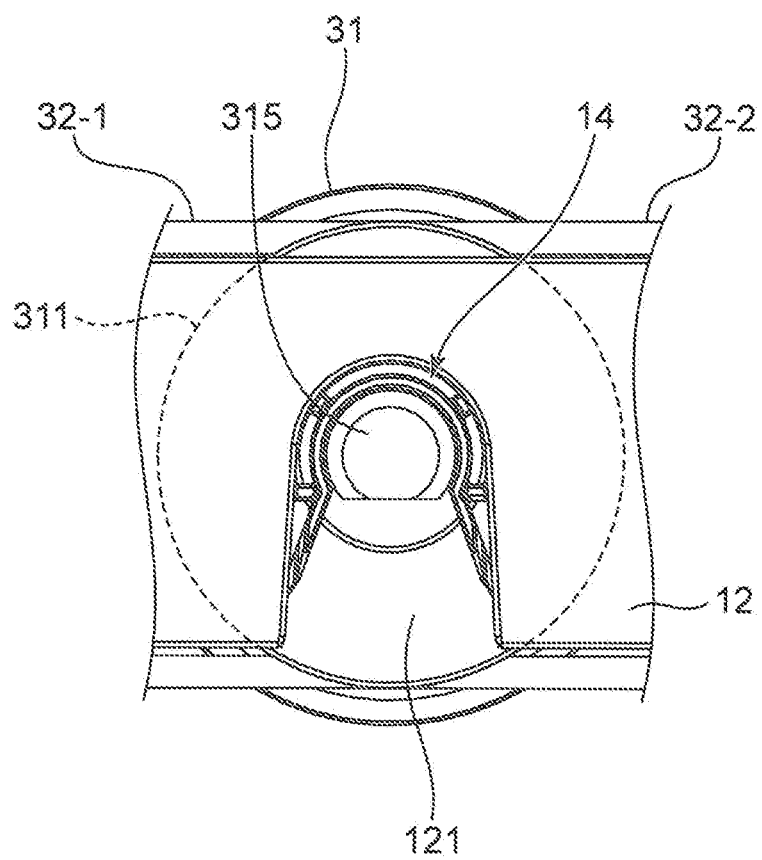
FIG. 6B is a front view of the finger guard member installed at the one end when a D-shaped fixed shaft has the first shaft diameter.
Figure 6C:
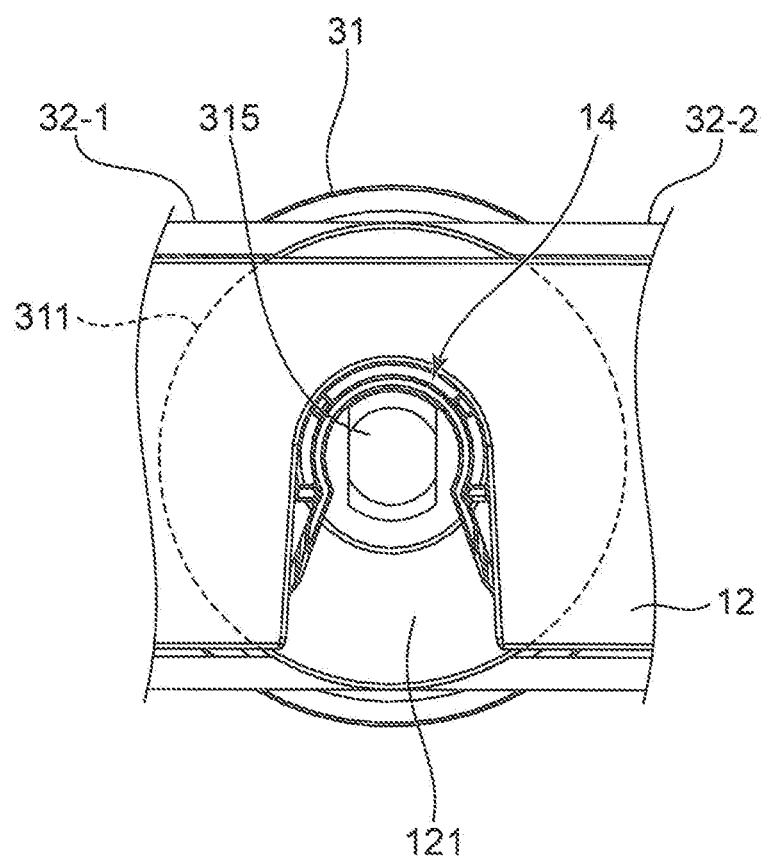
FIG. 6C is a front view of the finger guard member installed at the one end when an oval coin-shaped fixed shaft has the first shaft diameter.
Figure 6D:
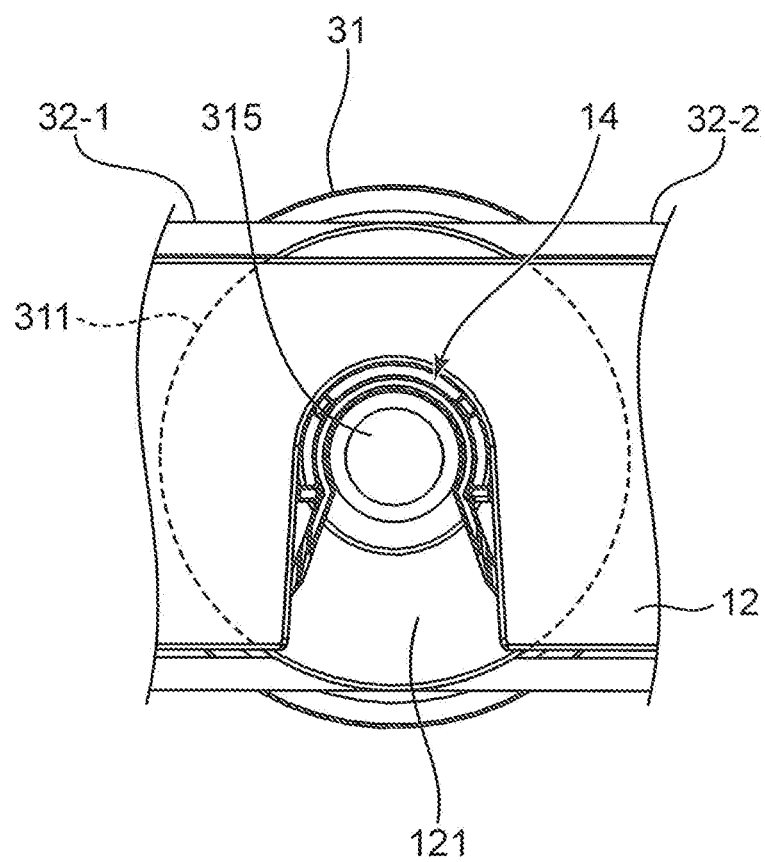
FIG. 6D is a front view of the finger guard member installed at the one end when a round fixed shaft has the first shaft diameter.

The arc-shaped part 141 is applicable to any shape of an end surface of the fixed shaft 315, a hexagonal shape, a D shape, an oval coin shape, and a round shape. FIG. 6A is a front view of the finger guard member 1 installed at the one end 311 when the hexagonal fixed shaft 315 has the first shaft diameter. FIG. 6B is a front view of the finger guard member 1 installed at the one end 311 when the D-shaped fixed shaft 315 has the first shaft diameter. FIG. 6C is a front view of the finger guard member 1 installed at the one end 311 when the oval coin-shaped fixed shaft 315 has the first shaft diameter. FIG. 6D is a front view of the finger guard member 1 installed at the one end 311 when the round fixed shaft 315 has the first shaft diameter. The oval coin shape is a shape defined by two opposing arc parts and two opposing straight parts. For the oval coin shape, the arc-shaped part 141 is supported by the upper arc part of the two arc parts. The arc-shaped part 141 is not supported by the two straight parts.

When the fixed shaft 315 has the second shaft diameter, the fixed shaft 315 cannot fit into the arc-shaped part 141 of the positioning part 14 because the size of the shaft diameter is too large. Therefore, by cutting the proximal ends of the rib parts 144 to 147 and the guide parts 142 and 143, the positioning part 14 can be removed from the second surface 12, as shown in FIG. 1D. That is, it is possible to make the positioning part 14 not present on the second surface 12.

Figure 7:
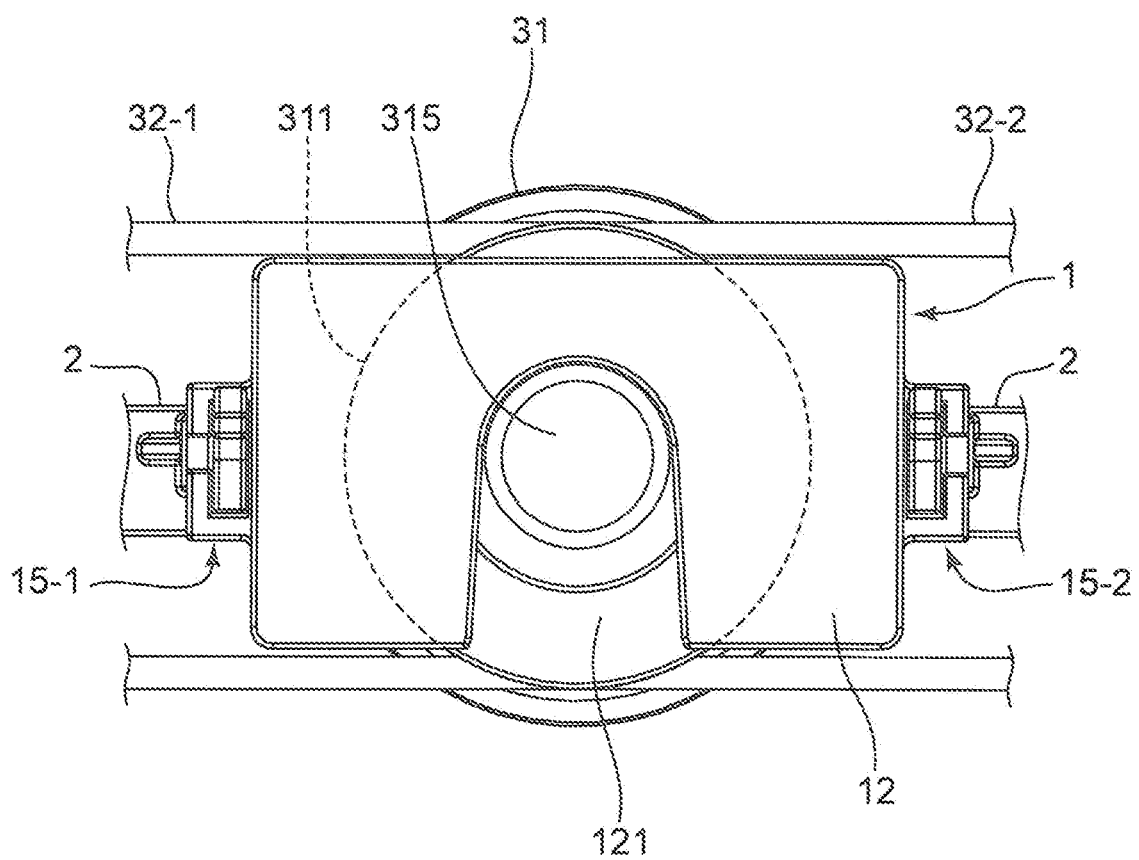
FIG. 7 is a front view of the finger guard member installed at the one end when the fixed shaft has a second shaft diameter.

FIG. 7 is a front view of the finger guard member 1 installed at the one end 311 when the fixed shaft 315 has the second shaft diameter. With reference to FIGS. 1D and 7, the finger guard member 1 is positioned by the edge of the notch 121 (edge of the tip portion of the notch 121) being supported by the peripheral surface of the fixed shaft 315.

In this way, in the finger guard member 1 according to the embodiment, the finger guard member 1 can be standardized between the roller 31 including the fixed shaft 315 having the first shaft diameter and the roller 31 including the fixed shaft 315 having the second shaft diameter. Therefore, according to the embodiment, costs of the finger guard member 1 can be reduced.

Figure 8A:
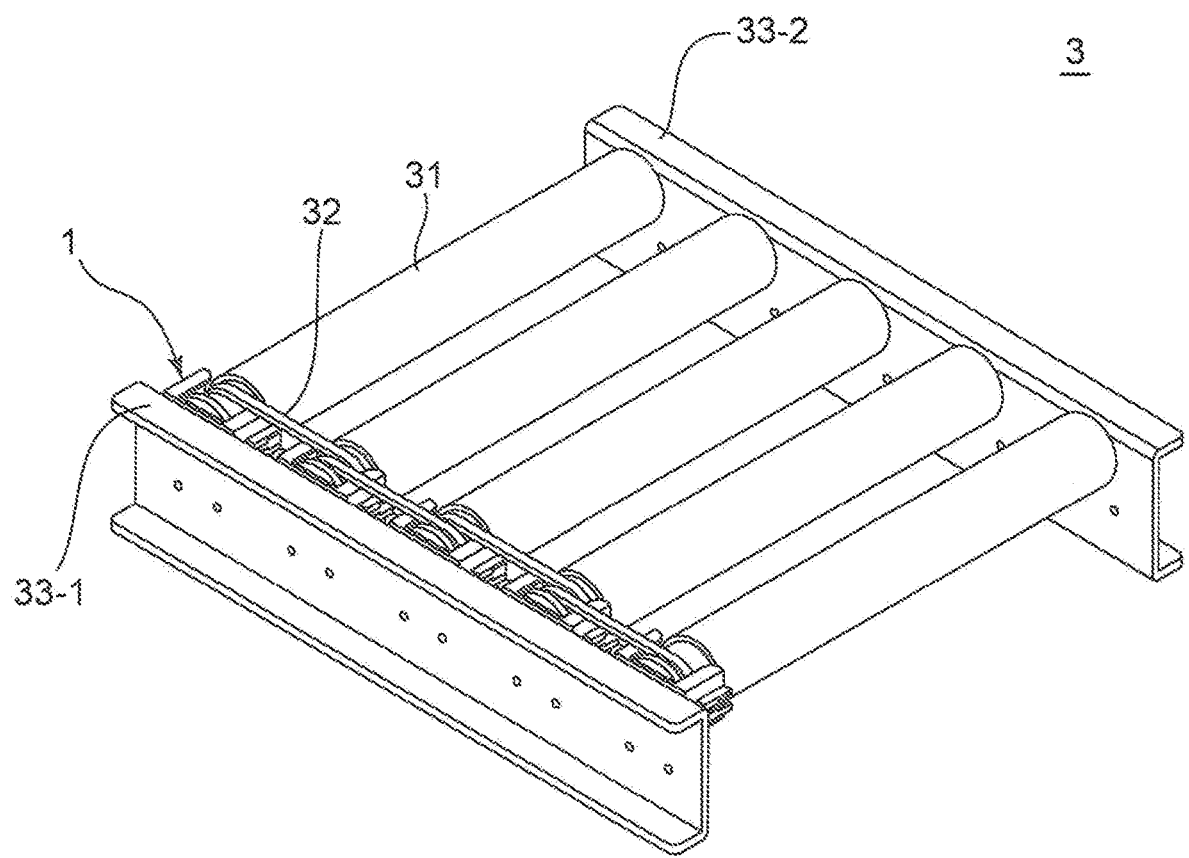
FIG. 8A is a perspective view of a part of the roller conveyor in which the finger guard members are installed.
Figure 8B:
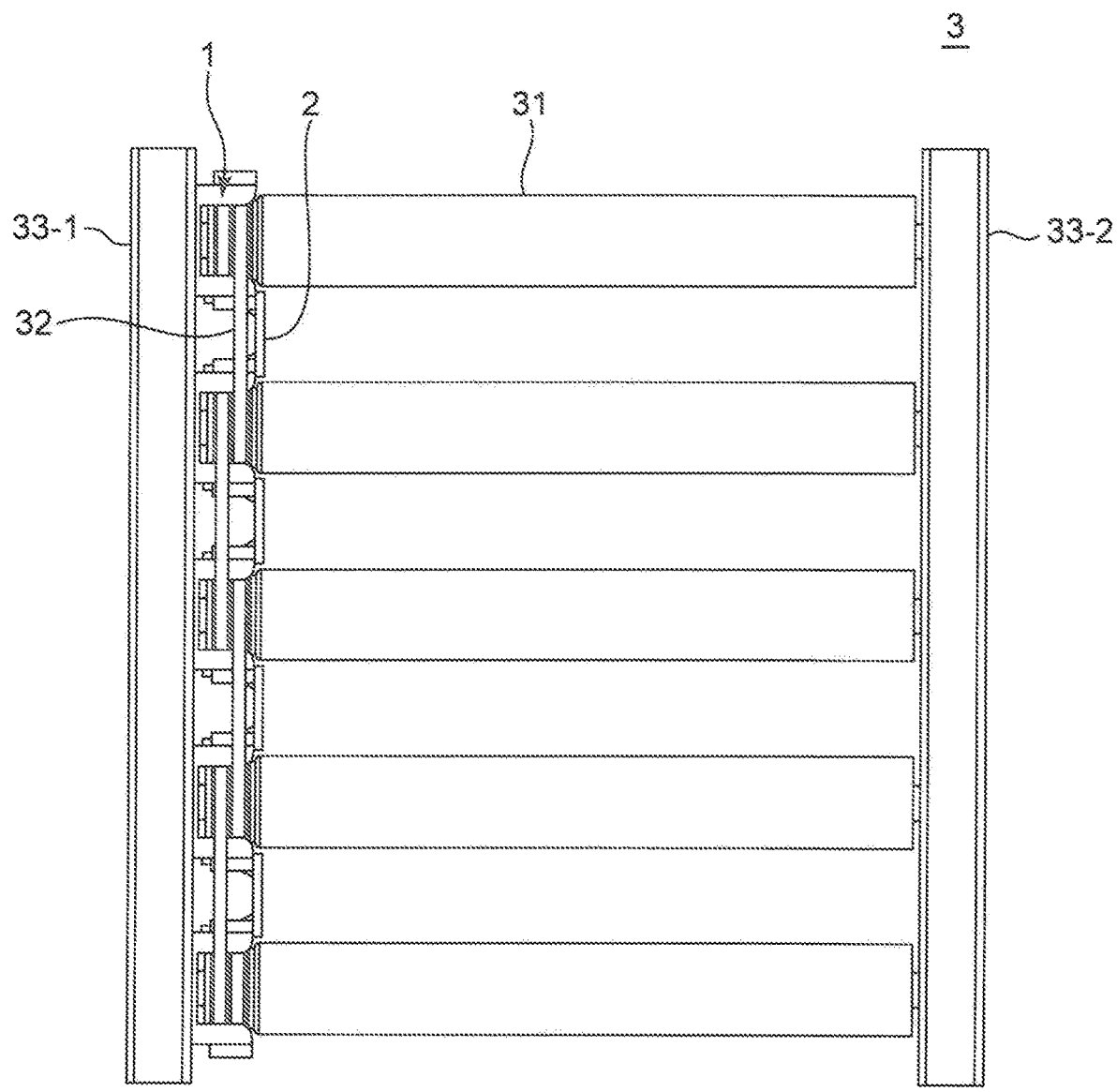
FIG. 8B is a plan view of the part.
Figure 8C:
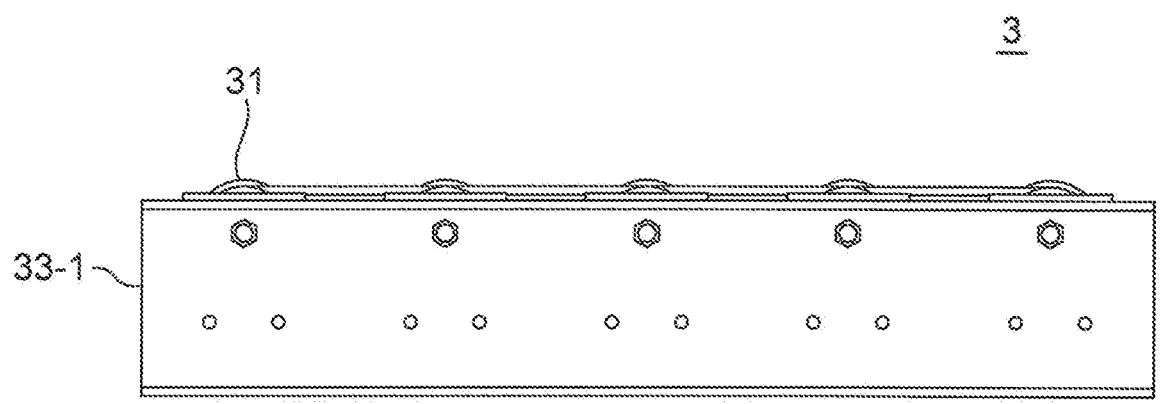
FIG. 8C is a side view of the part.
Figure 8D:
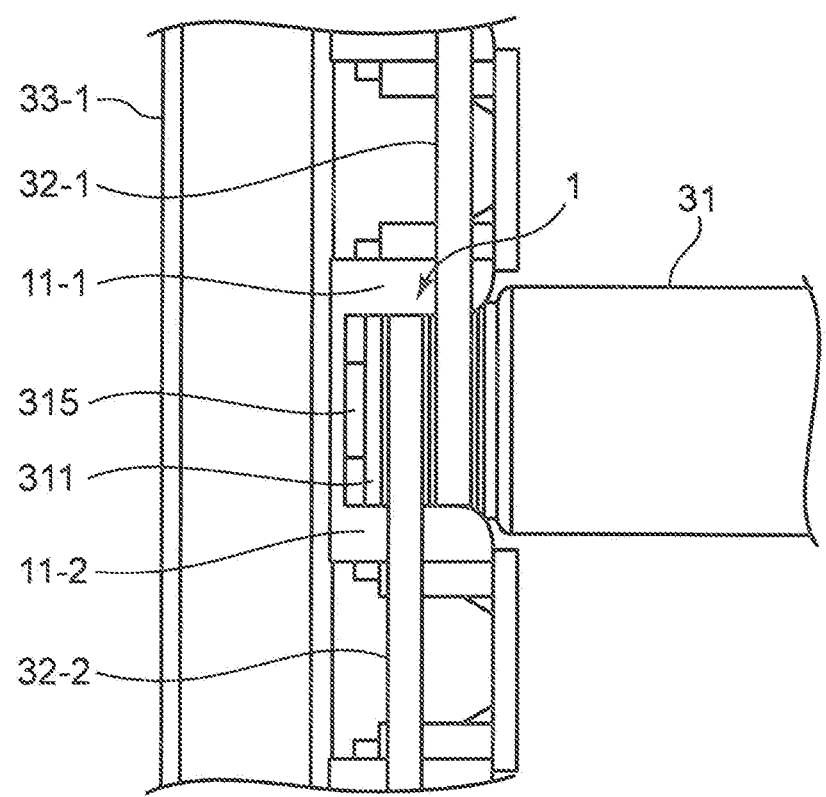
FIG. 8D is a plan view near the one end of the roller.
Figure 9:
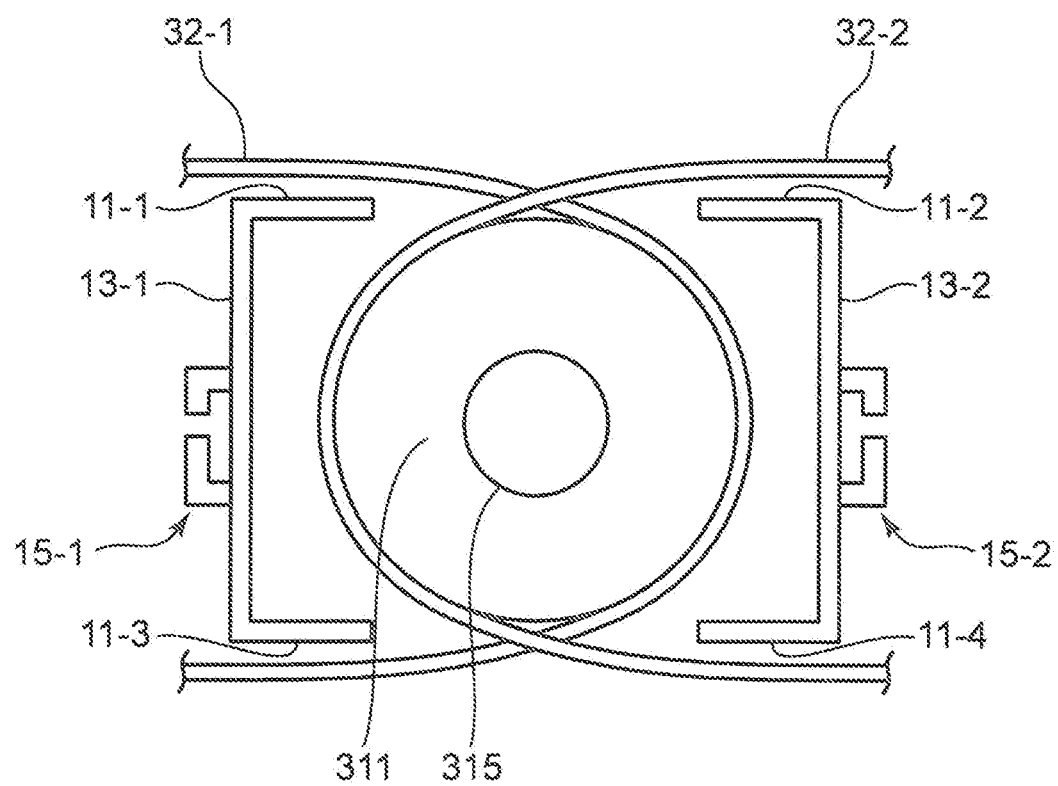
FIG. 9 is a front view of the finger guard member installed at the one end of the roller.

FIG. 8A is a perspective view of a part of the roller conveyor 3 in which the finger guard members 1 are installed. FIG. 8B is a plan view of the part. FIG. 8C is a side view of the part. FIG. 8D is a plan view near the one end 311 of the roller 31. The finger guard member 1 is installed at the one end 311 of the roller 31. FIG. 9 is a front view of the finger guard member 1 installed at the one end 311 of the roller 31. The second surface 12, the notch 121, and the frame 33-1 are omitted.

With reference to FIGS. 8A to 8D, a plurality of rollers 31 (five rollers 31) arranged in parallel is rotatably supported by the frame 33-1 disposed on the one end 311 side and a frame 33-2 disposed on the other end side. The belt 32 is wound between one end 311 of each of the plurality of rollers 31 and one end 311 of the adjacent roller 31.

With reference to FIGS. 8D and 9, the first surface 11 is disposed in a space formed by the one end 311 and the belt 32. In other words, the first surface 11 is disposed between the one end 311 and the belt 32. The belt 32-1 passes above the first surface 11-1 and below the first surface 11-3. The belt 32-2 passes above the first surface 11-2 and below the first surface 11-4.

The first surface 11 is disposed between the one end 311 and the belt 32, and the first surface 11 is disposed near the belt 32. This allows a gap between the first surface 11 and the belt 32 to be reduced to a size that does not allow a finger to pass. Therefore, even if a finger touches the belt 32 and the finger is pulled in the same direction as the belt 32, the finger stops before the gap between the first surface 11 and the belt 32. This makes it possible to prevent the finger from being caught between the one end 311 of the roller 31 and the belt 32.

A description will be provided using another expression. It is assumed that the one end 311 is divided into a central portion and both end portions along the direction in which the rollers 31 (FIG. 8B) are arranged. One of both ends of the one end 311 is surrounded by a surrounding portion formed by the first surface 11-1, the third surface 13-1, and the first surface 11-3. The other of both ends of the one end 311 is surrounded by a surrounding portion formed by the first surface 11-2, the third surface 13-2, and the first surface 11-4. Therefore, even if a finger touches the belt 32 and the finger is pulled in the same direction as the belt 32, the finger touches the surrounding portion and stops. This makes it possible to prevent the finger from being caught between the one end 311 and the belt 32.

Figure 10:
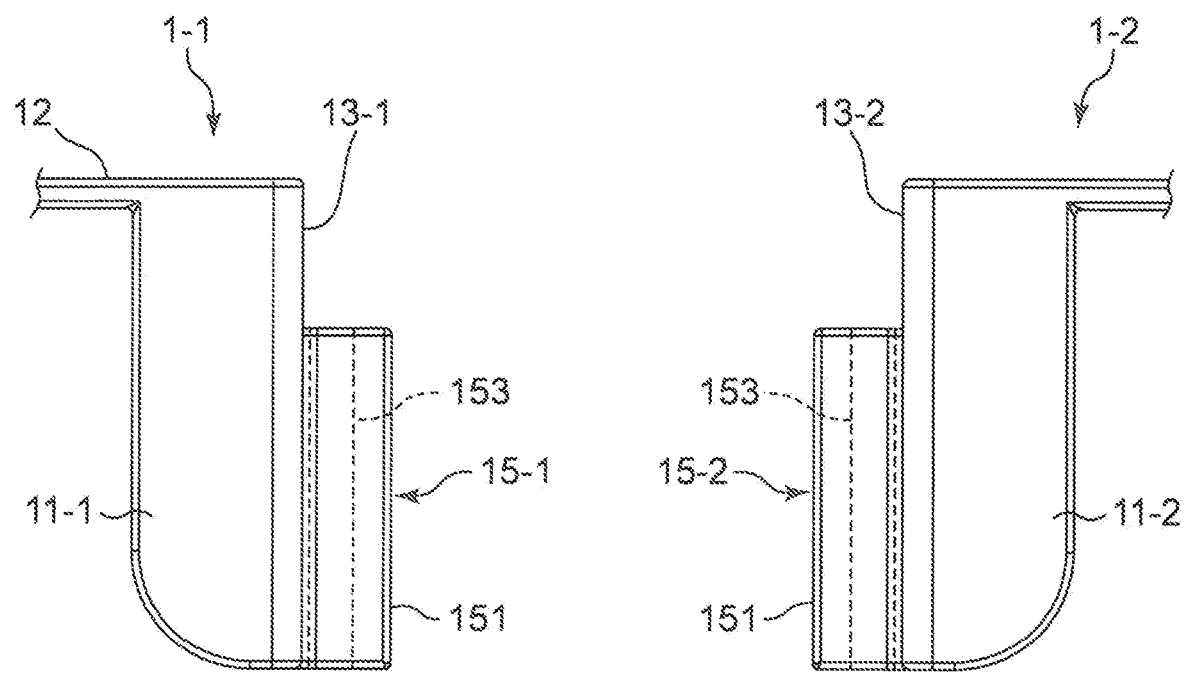
FIG. 10 is a plan view showing a relationship between a coupling member and a vicinity of fitting parts of the adjacent finger guard members.
Figure 10:
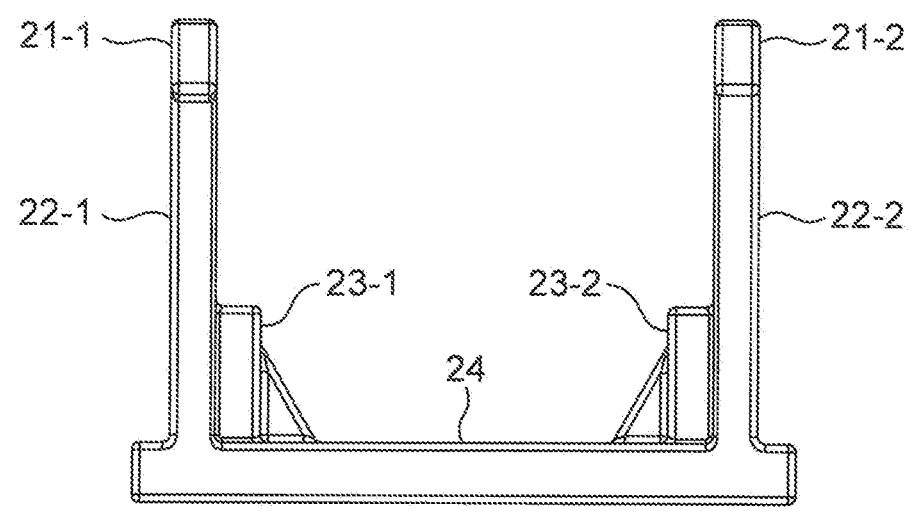
Figure 11A:
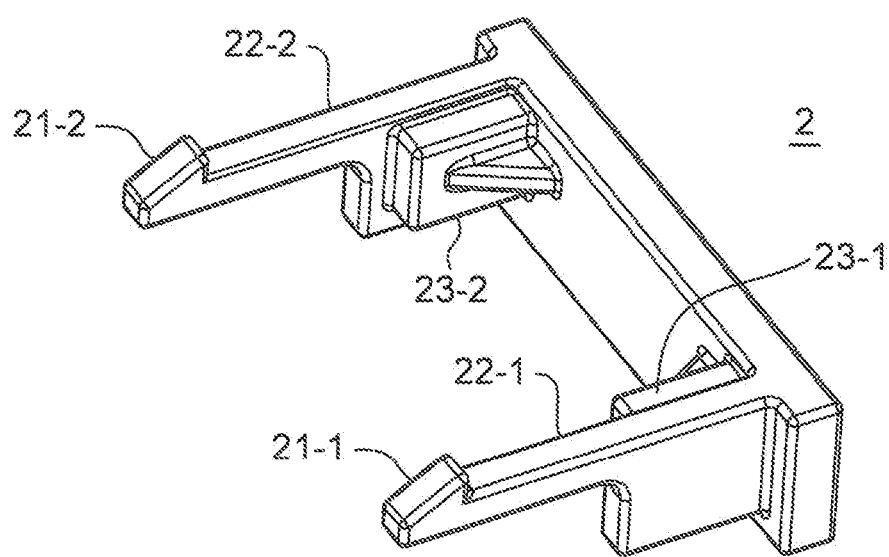
FIG. 11A is a perspective view of the coupling member.
Figure 11B:
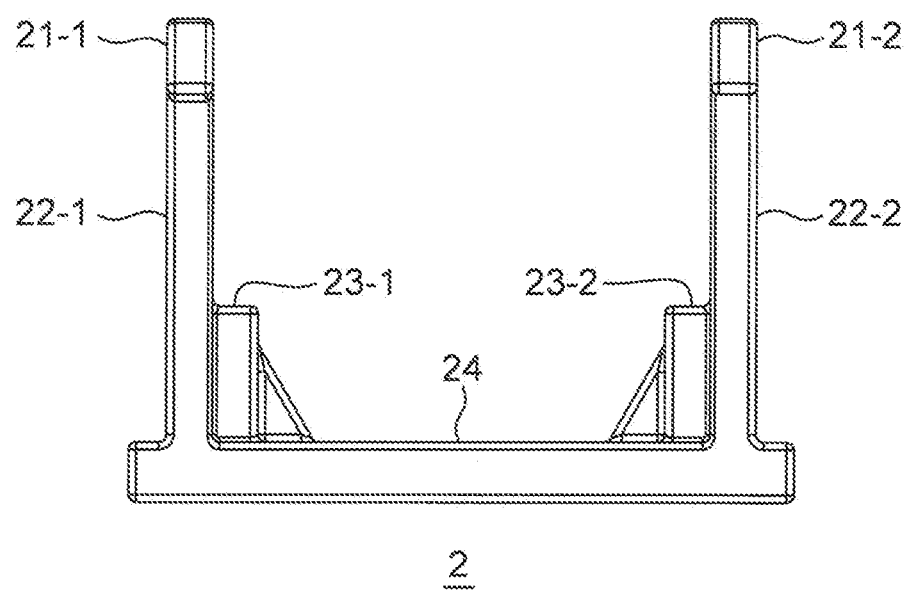
FIG. 11B is a top view of the coupling member.
Figure 11C:
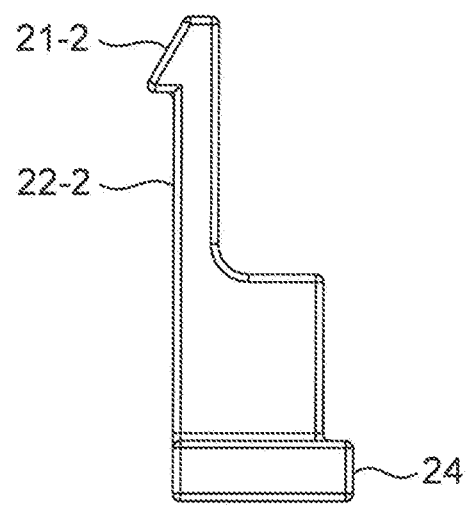
FIG. 11C is a side view of the coupling member.
Figure 11D:
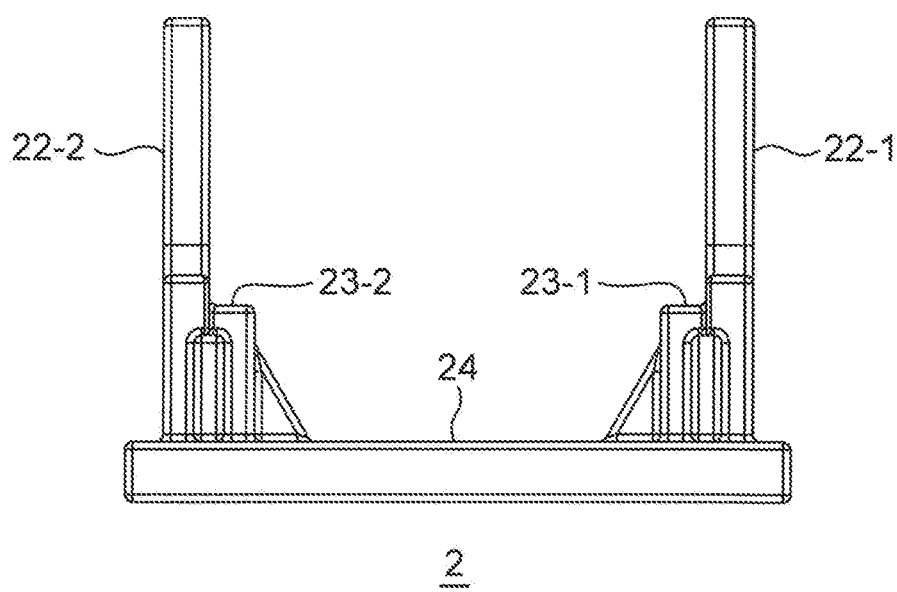
FIG. 11D is a bottom view of the coupling member.

The adjacent finger guard members 1 are coupled by a coupling member 2. FIG. 10 is a plan view showing a relationship between the coupling member 2 and a vicinity of the fitting parts 15 of the adjacent finger guard members 1. FIG. 11A is a perspective view of the coupling member 2. FIG. 11B is a top view of the coupling member 2. FIG. 11C is a side view of the coupling member 2. The left side view and the right side view of the coupling member 2 are the same. FIG. 11D is a bottom view of the coupling member 2.

With reference to FIGS. 11A to 11D, the coupling member 2 includes a snap fit part 22-1 (first snap fit part), a snap fit part 22-2 (second snap fit part), and a supporting part 24. The coupling member 2 is produced by metal molding or a three-dimensional printer. These components of the coupling member 2 are integrally formed. The supporting part 24 has a rectangular shape, the snap fit part 22-1 is formed at one end of the supporting part 24, and the snap fit part 22-2 is formed at the other end of the supporting part 24. When the coupling member 2 is viewed in plan view, the snap fit parts 22-1 and 22-2 extend in a direction perpendicular to the longitudinal direction of the supporting part 24.

The snap fit parts 22-1 and 22-2 have the same structure. A detailed description will be provided. The snap fit parts 22-1 and 22-2 are each a cantilever type, and include hook parts 21-1 and 21-2 at tip ends, respectively. When an upper surface of the coupling member 2 is a top side, the hook parts 21-1 and 21-2 face the top side (FIG. 11B). When the upper surface of the coupling member 2 is a ground side, the hook parts 21-1 and 21-2 face the ground side (FIG. 11D).

When a direction in which the snap fit parts 22-1 and 22-2 extend is a horizontal direction, vertical sizes of proximal ends of the snap fit parts 22-1 and 22-2 are greater than a vertical size of a part other than the proximal ends. A block part 23-1 is formed on a side surface facing the proximal end of the snap fit part 22-2 among side surfaces of the proximal end of the snap fit part 22-1. Similarly, a block part 23-2 is formed on a side surface facing the proximal end of the snap fit part 22-1 among the side surfaces of the proximal end of the snap fit part 22-2.

Figure 12:
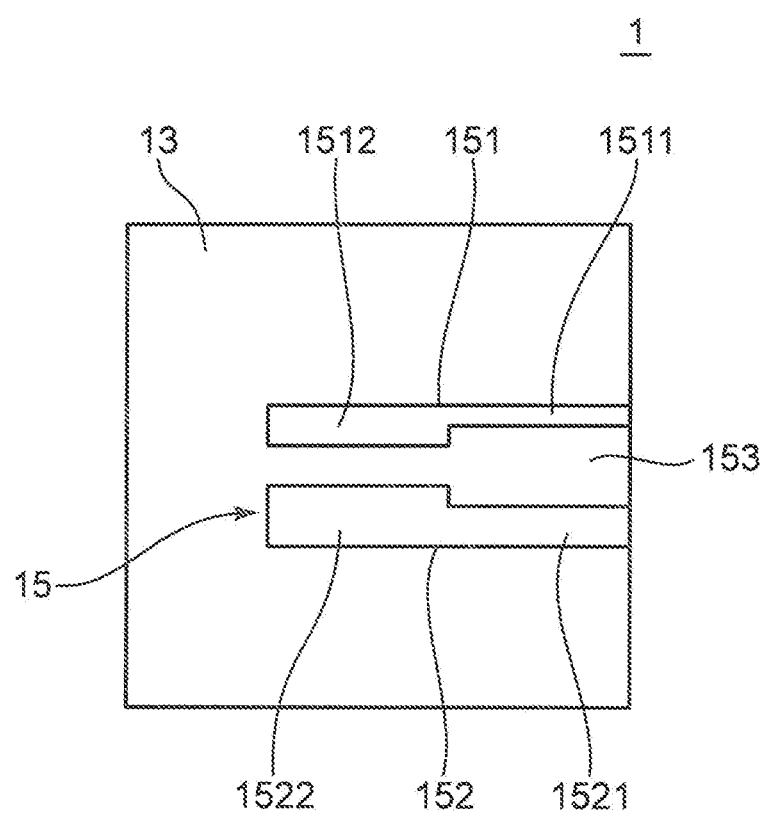
FIG. 12 is a side view of the fitting part.

FIG. 12 is a side view of the fitting part 15. The fitting parts 15-1 and 15-2 have the same structure and will be described as the fitting part 15. The fitting part 15 includes an upper side part 151 and a lower side part 152. The upper side part 151 and the lower side part 152 form a through hole 153 of the fitting part 15. When viewed from the front of the finger guard member 1 (FIG. 1C), the upper side part 151 extends in a lateral direction and is bent downward at a right angle. When viewed from the front of the finger guard member 1, the lower side part 152 extends in a lateral direction and is bent upward at a right angle.

The upper side part 151 includes a side surface including a side surface part 1511 and a side surface part 1512. The side surface part 1511 is positioned on a rear side of the finger guard member 1. The side surface part 1512 is positioned on a front side of the finger guard member 1. The size of the side surface part 1511 in a vertical direction is smaller than the size of the side surface part 1512 in a vertical direction. This forms a step between the side surface part 1511 and the side surface part 1512.

The lower side part 152 includes a side surface including a side surface part 1521 and a side surface part 1522. The side surface part 1521 is positioned on a rear side of the finger guard member 1. The side surface part 1522 is positioned on a front side of the finger guard member 1. The size of the side surface part 1521 in a vertical direction is smaller than the size of the side surface part 1522 in a vertical direction. This forms a step between the side surface part 1521 and the side surface part 1522.

The side surface part 1511 and the side surface part 1521 face each other. The side surface part 1512 and the side surface part 1522 face each other. An interval between the side surface part 1511 and the side surface part 1521 is larger than an interval between the side surface part 1512 and the side surface part 1522.

With reference to FIGS. 10 and 12, one of the adjacent finger guard members 1 is called a finger guard member 1-1, and the other is called a finger guard member 1-2. When the upper surface of the coupling member 2 is the top side (FIG. 11B), the snap fit part 22-1 (first snap fit part) corresponds to the fitting part 15-1 (first fitting part), and the snap fit part 22-2 (second snap fit part) corresponds to the fitting part 15-2 (second fitting part). When the upper surface of the coupling member 2 is the ground side (FIG. 11D), the snap fit part 22-1 (first snap fit part) corresponds to the fitting part 15-2 (second fitting part), and the snap fit part 22-2 (second snap fit part) corresponds to the fitting part 15-1 (first fitting part).

The snap fit part 22 is fitted into the through hole 153 of the fitting part 15 from the rear side of the finger guard member 1 with the upper surface of the coupling member 2 as the top side. A detailed description will be provided. The snap fit part 22-1 is fitted into the through hole 153 of the fitting part 15-1 provided in the finger guard member 1-1, with the hook part 21-1 of the snap fit part 22-1 at the head. Similarly, the snap fit part 22-2 is fitted into the through hole 153 of the fitting part 15-2 provided in the finger guard member 1-2, with the hook part 21-2 of the snap fit part 22-2 at the head.

Figure 13:
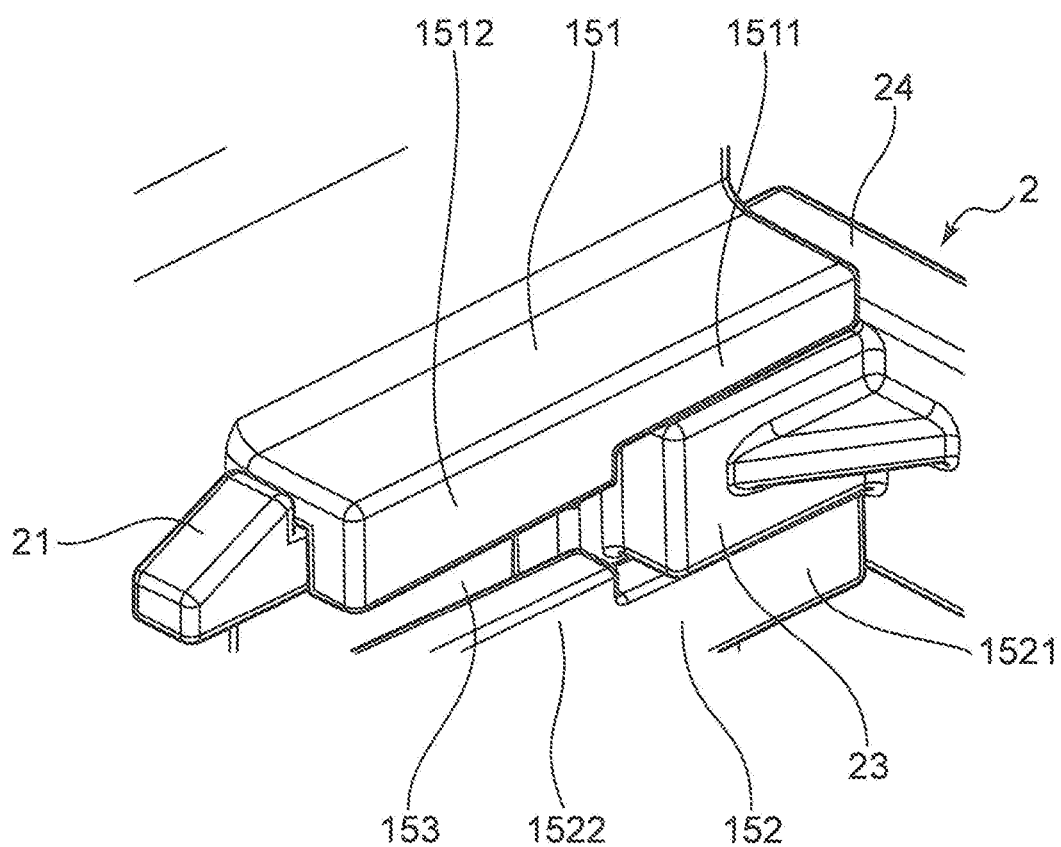
FIG. 13 is a perspective view showing that fitting of a snap fit part into the fitting part is completed.

FIG. 13 is a perspective view showing that fitting of the snap fit part 22 into the fitting part 15 is completed. The hook part 21 is caught at an upper end of an exit of the through hole 153. With this configuration, even when the coupling member 2 is pulled, the snap fit part 22 cannot be pulled out from the fitting part 15. When the coupling member 2 is pulled with the hook part 21 pushed from above, the snap fit part 22 can be pulled out from the fitting part 15.

Figure 14A:
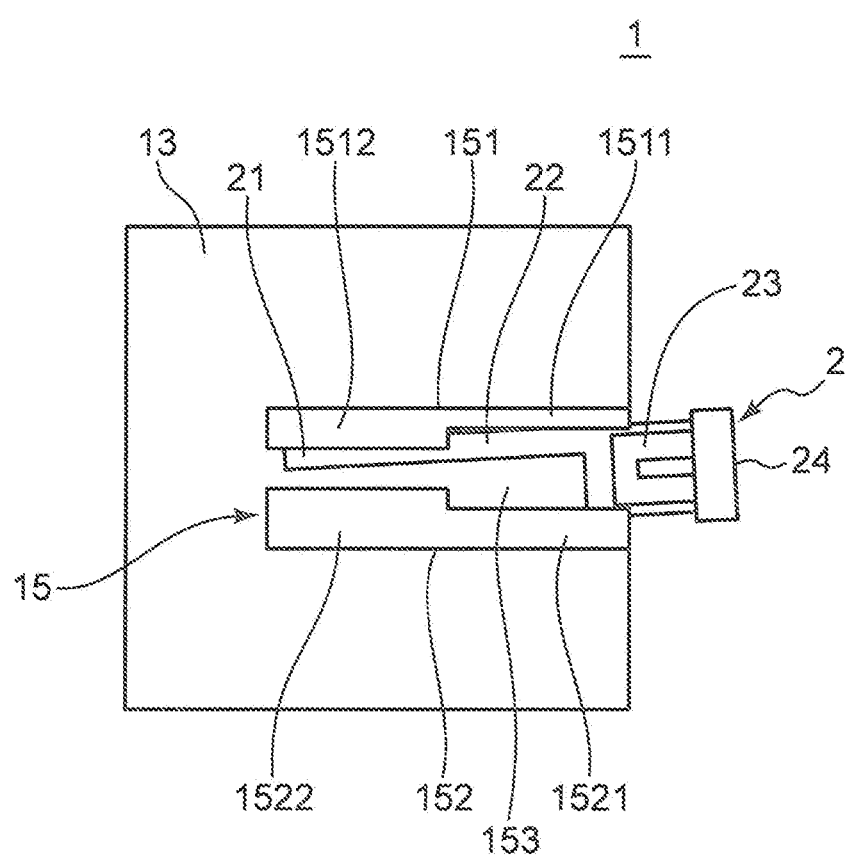
FIG. 14A is an explanatory view describing that the snap fit part is about to be fitted into the fitting part with an upper surface of the coupling member on a top side.
Figure 14B:
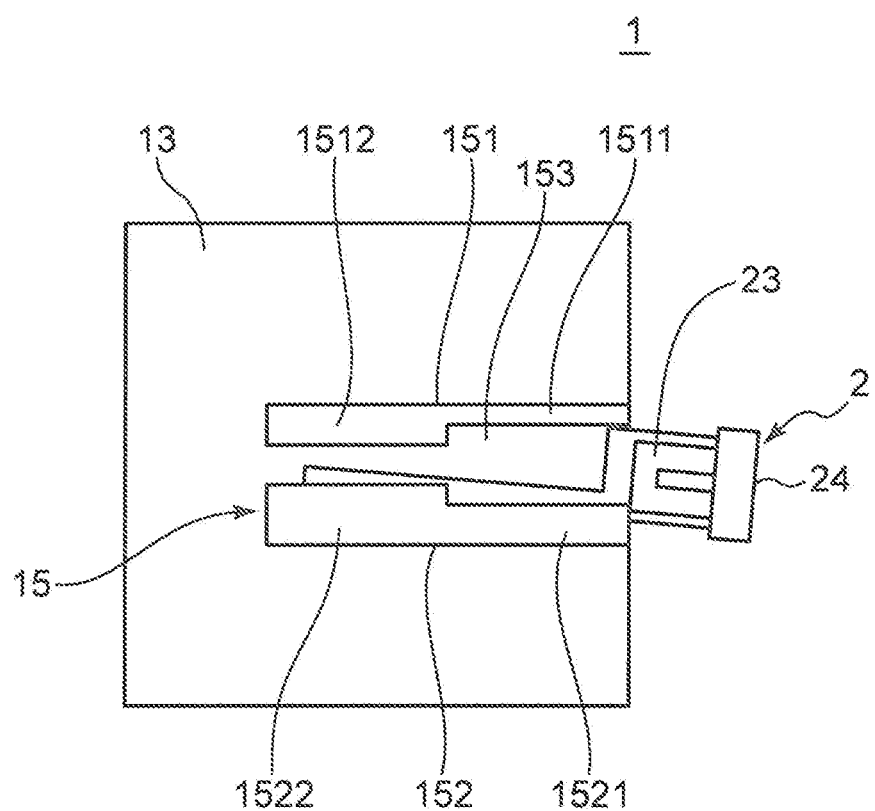
FIG. 14B is an explanatory view describing that the snap fit part is about to be fitted into the fitting part with the upper surface of the coupling member on a ground side.

The block part 23 is fitted into a space (gap) defined by the side surface part 1511 and the side surface part 1521. Functions of the block part 23 will be described. FIG. 14A is an explanatory view describing that the snap fit part 22 is about to be fitted into the fitting part 15 with the upper surface of the coupling member 2 on the top side. FIG. 14B is an explanatory view describing that the snap fit part 22 is about to be fitted into the fitting part 15 with the upper surface of the coupling member 2 on the ground side.

With reference to FIG. 14A, when the upper surface of the coupling member 2 is the top side, the block part 23 can enter the space formed by the side surface part 1511 and the side surface part 1521, and the snap fit part can be fitted into the fitting part 15. However, with reference to FIG. 14B, when the upper surface of the coupling member 2 is the ground side, since the block part 23 abuts on an entrance of the fitting part 15 (through hole 153), the block part 23 cannot enter the space formed by the side surface part 1511 and the side surface part 1521. This prevents the snap fit part 22 from being fitted into the fitting part 15.

With reference to FIG. 10, the snap fit part 22-1 is designed such that the snap fit part 22-1 can be fitted into the fitting part 15-1, and the snap fit part 22-2 is designed such that the snap fit part 22-2 can be fitted into the fitting part 15-2. When the coupling member 2 is upside down, the snap fit part 22-1 is fitted into the fitting part 15-2, and the snap fit part 22-2 is fitted into the fitting part 15-1, then the snap fit part 22-1 and the snap fit part 22-2 may not be able to be smoothly removed or may not be able to be removed from the fitting part 15-2 and the fitting part 15-1, respectively. As described above, this can be prevented according to the embodiment.

Figure 15A:
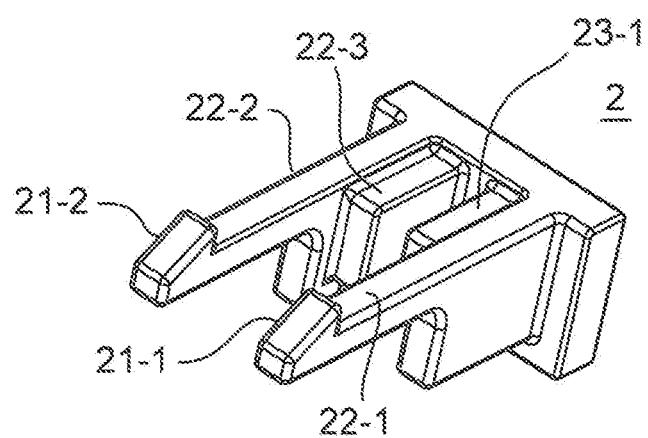
FIG. 15A is a perspective view of the coupling member.
Figure 15B:
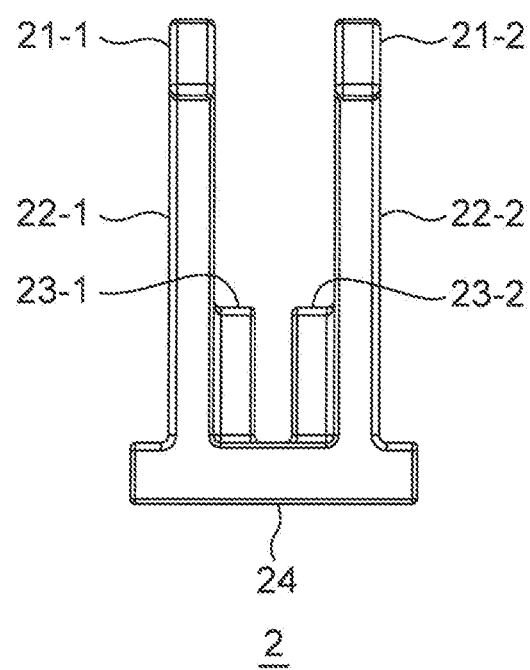
FIG. 15B is a top view of the coupling member.
Figure 15C:
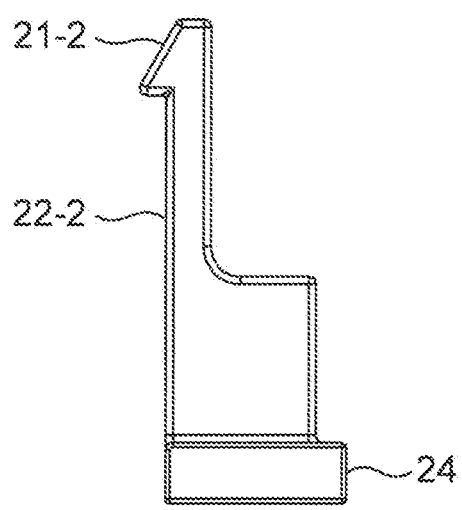
FIG. 15C is a side view of the coupling member.
Figure 15D:
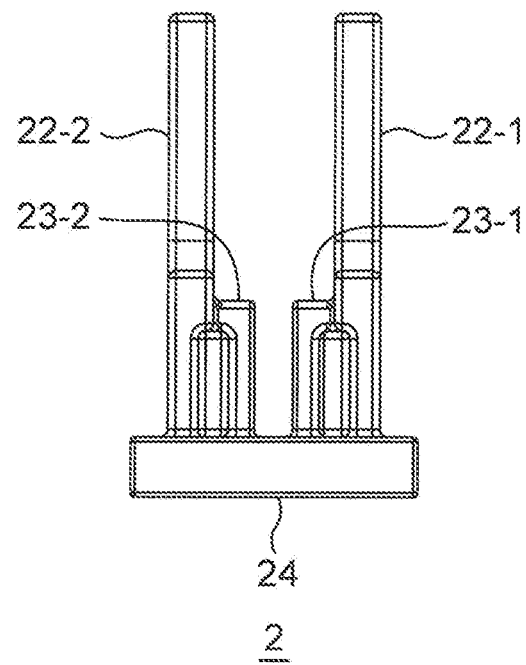
FIG. 15D is a bottom view of the coupling member.

With reference to FIGS. 4B and 10, a size of the supporting part 24 in the longitudinal direction differs according to a pitch in which the rollers 31 are arranged. Therefore, a plurality of types of coupling member 2 is prepared according to the pitch. For example, it is assumed that there are two types of pitch, large pitch and small pitch. The coupling member 2 shown in FIG. 10 is used when the pitch is large. When the pitch is small, the coupling member 2 shown in FIGS. 15A to 15D is used. FIG. 15A is a perspective view of the coupling member 2. FIG. 15B is a top view of the coupling member 2. FIG. 15C is a side view of the coupling member 2. The left side view and the right side view of the coupling member 2 are the same. FIG. 15D is a bottom view of the coupling member 2. A difference between the coupling member 2 shown in FIGS. 15A to 15D and the coupling member 2 shown in FIGS. 11A to 11D is the size of the supporting part 24 in the longitudinal direction. The coupling member 2 shown in FIGS. 15A to 15D, which is used when the pitch is small, is smaller than the coupling member 2 shown in FIGS. 11A to 11D in the size of the supporting part 24 in the longitudinal direction.

Figure 16A:
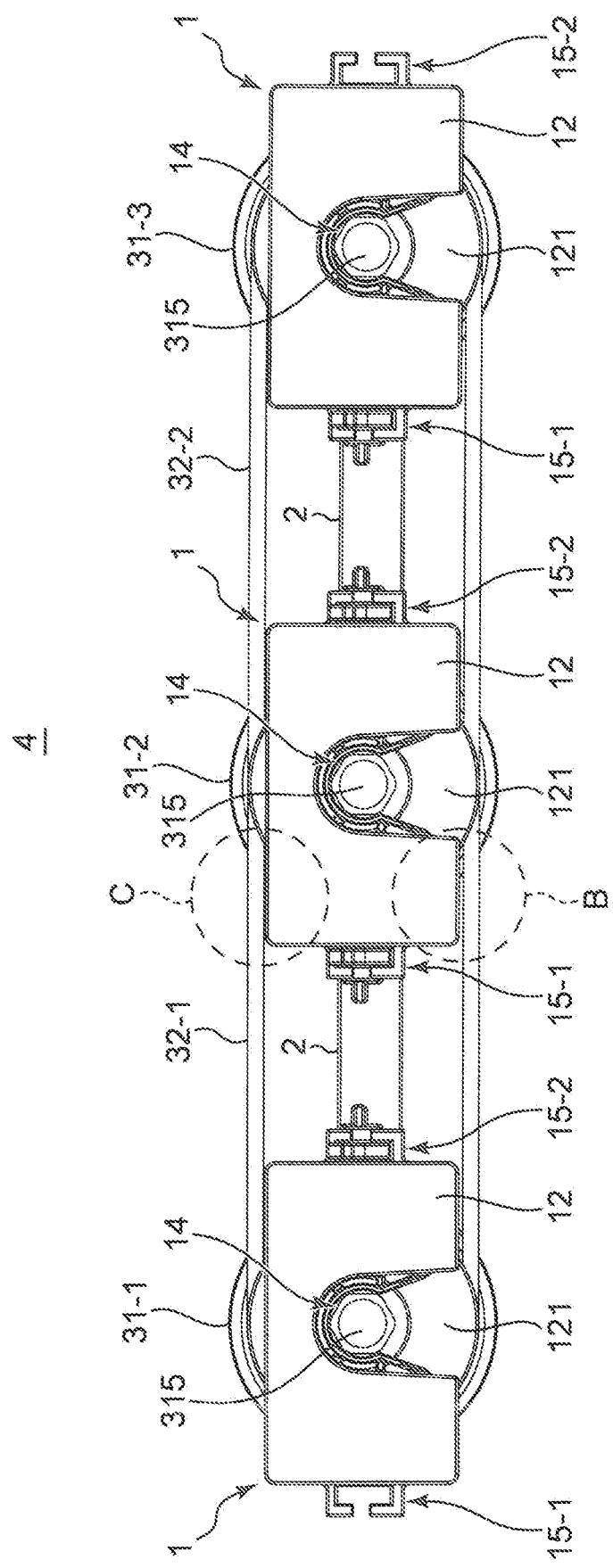
FIG. 16A is a front view of a finger guard member coupling structure according to the embodiment.

FIG. 16A is a front view of a finger guard member coupling structure 4 according to the embodiment. The roller conveyor 3 includes a large number of rollers 31. In FIG. 16A, three rollers 31 are shown. The finger guard member coupling structure 4 will be described with reference to FIGS. 4B and 16A. In FIG. 16A, the frame 33-1 to which the fixed shaft 315 (FIG. 4A) is fixed is omitted. Three (a plurality of) finger guard members 1 are arranged in a line. Each finger guard member 1 is installed at the one end 311 (FIG. 4A) of each roller 31. The adjacent finger guard members 1 are coupled by the coupling member 2.

Figure 16B:
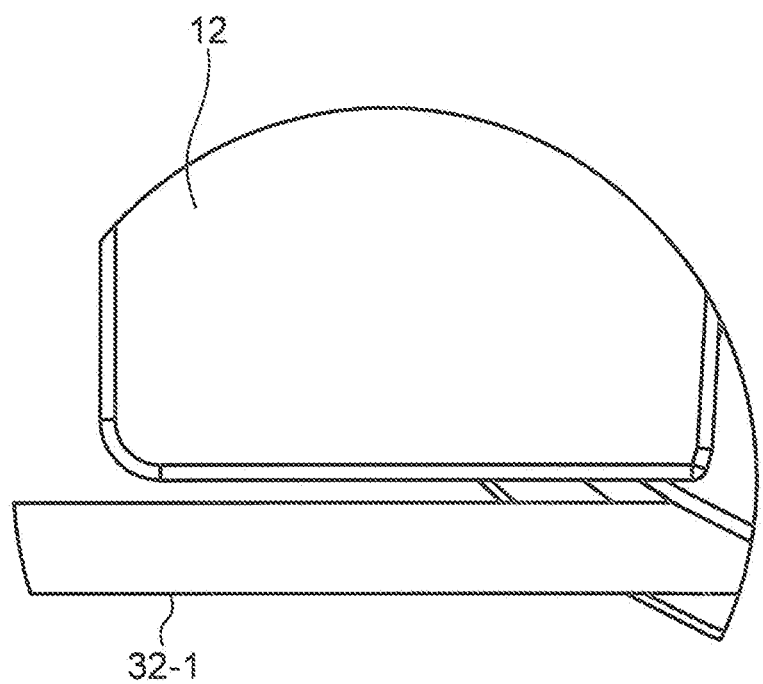
FIG. 16B is an enlarged view of a portion indicated by a circle B in FIG. 16A.
Figure 16C:
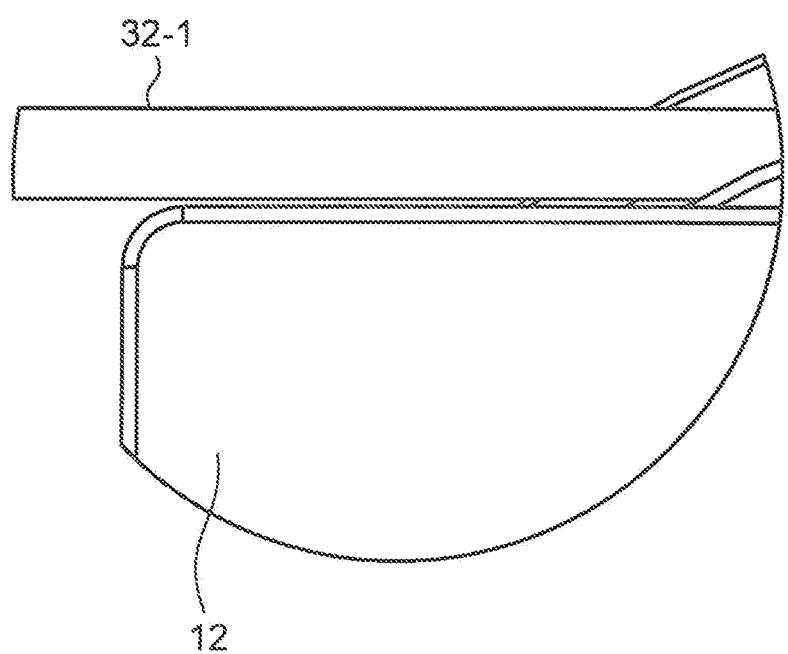
FIG. 16C is an enlarged view of a portion indicated by a circle C in FIG. 16A.

FIG. 16B is an enlarged view of a portion indicated by a circle B in FIG. 16A. The portion indicated by the circle B shows a vicinity of the belt 32-1 and the first surface 11-3 (FIG. 1B). FIG. 16C is an enlarged view of a portion indicated by a circle C in FIG. 16A. The portion indicated by the circle C shows a vicinity of the belt 32-1 and the first surface 11-1 (FIG. 1B). The gap between the belt 32-1 and the first surface 11-3 and the gap between the belt 32-1 and the first surface 11-1 are small. This makes it possible to prevent a finger from being caught between the one end 311 of the roller 31-2 (FIG. 4A) and the belt 32-1.

If the finger guard member 1 is only supported by the peripheral surface of the fixed shaft 315, the finger guard member 1 is supported at one point, and the finger guard member 1 cannot be stably installed. According to the finger guard member coupling structure 4 according to the embodiment, the finger guard member coupling structure 4 is supported at multiple points by coupling the adjacent finger guard members 1. This allows each finger guard member 1 to be installed stably.

The finger guard member 1 can be stably installed by forming two hooks (not shown) at intervals at upper ends of the second surface 12, and hooking these hooks at upper edges of the frame 33-1 (FIG. 8C) (in other words, hanging the finger guard member 1 on the frame 33-1). In this case, a distance between the hooks and the tip portion of the notch 121 needs be designed appropriately such that the fixed shaft 315 is disposed within the notch 121 with the hooks hooked at the upper edges of the frame 33-1 (if this distance is too large, when the arc-shaped part 141 (FIG. 1C) is supported by the peripheral surface of the fixed shaft 315, the hooks float from the upper edges of the frame 33-1). This distance is determined according to a height of the frame 33-1 (in other words, a vertical size of the frame 33-1). Therefore, when there are several types of frame 33-1 having different heights, it is necessary to manufacture the finger guard member 1 for each type of frame 33-1, and the finger guard member 1 cannot be standardized. According to the finger guard member coupling structure 4 according to the embodiment, each finger guard member 1 is stably installed by coupling the adjacent finger guard members 1, and such a problem does not occur.

Figure 17A:
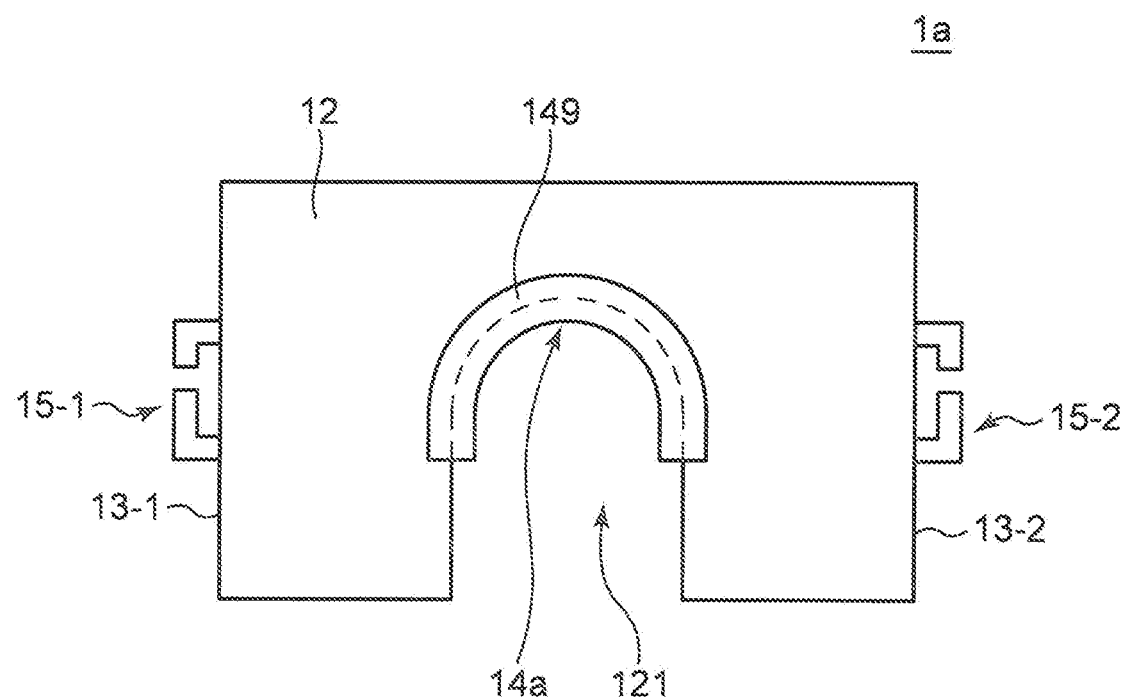
FIG. 17A is a front view of a finger guard member including a positioning part according to a modified example.
Figure 17B:
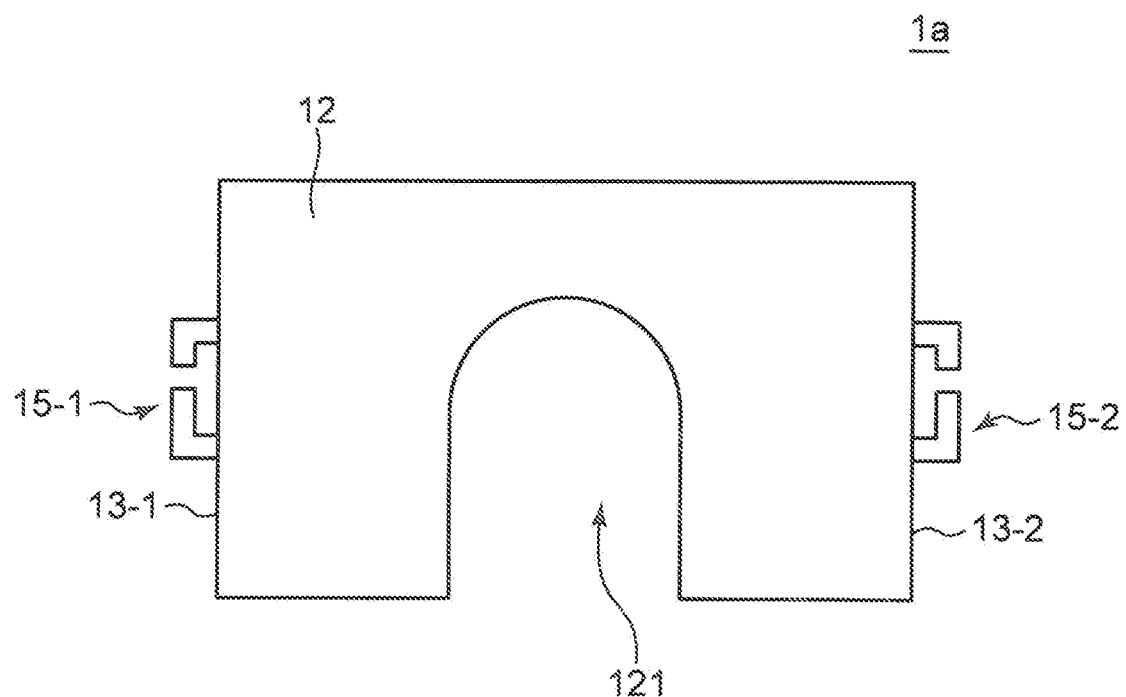
FIG. 17B is a front view with the positioning part removed from the finger guard member in FIG. 17A.

A modified example of the positioning part 14 will be described. FIG. 17A is a front view of a finger guard member 1a including a positioning part 14a according to the modified example. FIG. 17B is a front view with the positioning part 14a removed from the finger guard member 1a in FIG. 17A. A difference between the finger guard member 1a and the finger guard member 1 according to the embodiment is the positioning part 14a.

Figure 18A:
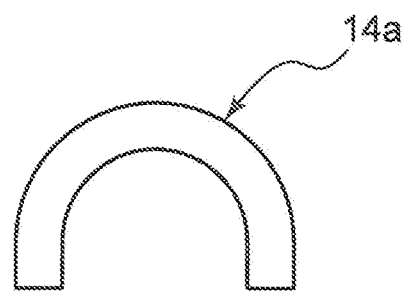
FIG. 18A is a front view of the positioning part according to the modified example.
Figure 18B:
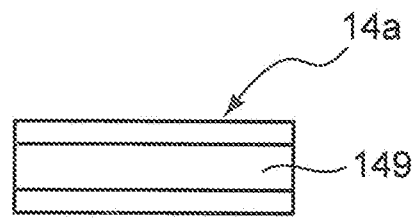
FIG. 18B is a top view of the positioning part according to the modified example.
Figure 18C:
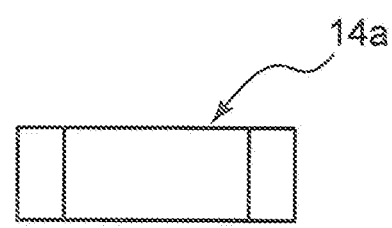
FIG. 18C is a bottom view of the positioning part according to the modified example.
Figure 18D:
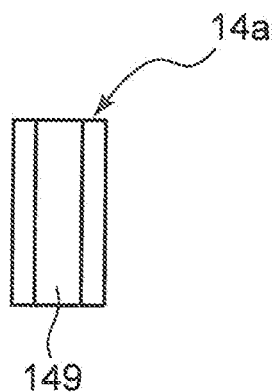
FIG. 18D is a side view of the positioning part according to the modified example.

FIG. 18A is a front view of the positioning part 14a according to the modified example. FIG. 18B is a top view of the positioning part 14a according to the modified example. FIG. 18C is a bottom view of the positioning part 14a according to the modified example. FIG. 18D is a side view of the positioning part 14a according to the modified example. The positioning part 14a has an arc shape. A groove 149 is formed along a side part of the positioning part 14a. The groove 149 is fitted into the tip portion of the notch 121, whereby the positioning part 14a is attached to the finger guard member 1a. When the fixed shaft 315 has the first shaft diameter, the positioning part 14a is attached to the finger guard member 1a (FIG. 17A). When the fixed shaft 315 has the second shaft diameter, the positioning part 14a is removed from the finger guard member 1a (FIG. 17B).

A modified example of the coupling member 2 will be described. FIG. 19A is a front view showing a relationship between a coupling member 2a according to the modified example and a vicinity of insertion parts 19 of adjacent finger guard members 1b. FIG. 19B is a front view showing that the adjacent finger guard members 1b in FIG. 19A are coupled by the coupling member 2a according to the modified example. A difference between the finger guard member 1b and the finger guard member 1 according to the embodiment is that insertion parts 19-1 and 19-2 are provided instead of the fitting part 15.

The coupling member 2a includes cantilever parts 27-1 and 27-2 and a supporting part 28. The coupling member 2a is produced by metal molding or a three-dimensional printer. These components of the coupling member 2a are integrally formed. The supporting part 28 has a rectangular shape, the cantilever part 27-1 is formed at one end of the supporting part 28, and the cantilever part 27-2 is formed at the other end of the supporting part 28. When the coupling member 2a is viewed in plan view, the cantilever parts 27-1 and 27-2 extend in a direction perpendicular to the longitudinal direction of the supporting part 28.

The insertion parts 19-1 and 19-2 have the same structure, and through holes 191 are formed. The insertion part 19-1 is formed on the third surface 13-1. The insertion part 19-2 is formed on the third surface 13-2. The cantilever part 27-1 is inserted into the through hole 191 of the insertion part 19-1, and the cantilever part 27-2 is inserted into the through hole 191 of the insertion part 19-2, whereby the adjacent finger guard members 1b are coupled by the coupling member 2a.

Summary of Embodiment

A finger guard member according to an embodiment is a finger guard member for a roller conveyor, the finger guard member including: a first surface disposed between one end of a roller provided in the roller conveyor and a belt wound around the one end; a second surface in which a notch having a width larger than a shaft diameter of a fixed shaft of the roller is formed with respect to the fixed shaft positioned outside the one end in a longitudinal direction of the roller; and a positioning part disposed inside the notch. When the fixed shaft has a first shaft diameter, the finger guard member is positioned by the positioning part being supported by a peripheral surface of the fixed shaft. When the fixed shaft has a second shaft diameter greater than the first shaft diameter, the finger guard member is positioned by an edge of the notch being supported by the peripheral surface of the fixed shaft with the positioning part being not present on the second surface.

The first surface is disposed between the one end of the roller and the belt, and the first surface is disposed near the belt. This allows a gap between the first surface and the belt to be reduced to a size that does not allow a finger to pass. Therefore, even if the finger touches the belt and the finger is pulled in the same direction as the belt, the finger stops before the gap between the first surface and the belt. This makes it possible to prevent the finger from being caught between the one end of the roller and the belt.

The finger guard member is positioned using the fixed shaft of the roller. Here, the finger guard member is positioned in two directions (in other words, a direction in which the rollers are arranged and a vertical direction of the finger guard member) orthogonal to the longitudinal direction of the roller (in other words, axial direction of the fixed shaft).

When the fixed shaft has the first shaft diameter, the finger guard member is positioned by the positioning part disposed inside the notch being supported by the peripheral surface of the fixed shaft. In contrast, when the fixed shaft has the second shaft diameter greater than the first shaft diameter, the finger guard member is positioned by the edge of the notch being supported by the peripheral surface of the fixed shaft with the positioning part being not present on the second surface.

A description will be provided specifically. It is assumed that the notch has an arch shape and the positioning part includes an arc-shaped part. For the first shaft diameter, the finger guard member is positioned by the arc-shaped part being supported by the peripheral surface of the fixed shaft. In contrast, for the second shaft diameter, the finger guard member is positioned by an edge of a tip portion of the notch having the arch shape being supported by the peripheral surface of the fixed shaft.

In this way, in the finger guard member according to the embodiment, the finger guard member can be standardized between the roller including the fixed shaft having the first shaft diameter and the roller including the fixed shaft having the second shaft diameter. Therefore, with the finger guard member according to the embodiment, costs of the finger guard member can be reduced.

In the above-described configuration, for the first shaft diameter, the finger guard member is positioned with the fixed shaft being fitted into the arc-shaped part, and a distance between both ends of the arc-shaped part is smaller than the first shaft diameter.

For the first shaft diameter, the finger guard member is positioned with the fixed shaft being fitted into the arc-shaped part. The distance between both ends of the arc-shaped part is smaller than the first shaft diameter, making it possible to prevent the finger guard member from easily coming off the fixed shaft with the finger guard member being positioned.

In the above-described configuration, the positioning part further includes: a first guide part connected to one of the both ends to guide the fixed shaft to the arc-shaped part; and a second guide part connected to another of the both ends to guide the fixed shaft to the arc-shaped part, and an interval between the first guide part and the second guide part is shortened toward the arc-shaped part.

The fixed shaft is guided by the first guide part and the second guide part to be fitted into the arc-shaped part. Since the interval between the first guide part and the second guide part is shortened toward the arc-shaped part, even if the distance between the both ends of the arc-shaped part is smaller than the first shaft diameter, the fixed shaft can be easily fitted into the arc-shaped part.

In the above-described configuration, the positioning part further includes a rib part connected to the edge of the notch.

For the second shaft diameter, it is necessary to make the positioning part not present on the second surface. With this configuration, the positioning part can be removed from the second surface by cutting the rib part (that is, it is possible to make the positioning part not present on the second surface).

A finger guard member coupling structure according to the embodiment includes: a plurality of the finger guard members according to the embodiment arranged in a row; and a plurality of coupling members each coupling the adjacent finger guard members.

If the finger guard member is only supported by the peripheral surface of the fixed shaft, the finger guard member is supported at one point, and the finger guard member cannot be stably installed. According to the finger guard member coupling structure according to the present invention, the finger guard member coupling structure is supported at multiple points by coupling the adjacent finger guard members. This allows each finger guard member to be installed stably.

In the above-described configuration, one of the adjacent finger guard members includes a first fitting part, another of the adjacent finger guard members includes a second fitting part, each of the coupling members includes: a first snap fit part of a cantilever type including a first hook part and configured to fit into the first fitting part; and a second snap fit part of a cantilever type including a second hook part and configured to fit into the second fitting part, the first snap fit part allows removal from the first fitting part by the first hook part being pushed from above with the first snap fit part being fitted into the first fitting part, and the second snap fit part allows removal from the second fitting part by the second hook part being pushed from above with the second snap fit part being fitted into the second fitting part.

This configuration is a specific example of each coupling member. The first snap fit part of the coupling member is fitted into the first fitting part of one finger guard member, whereby the coupling member and the one finger guard member are fixed. The second snap fit part of the coupling member is fitted into the second fitting part of the other finger guard member, whereby the coupling member and the other finger guard member are fixed. With this configuration, the adjacent finger guard members are coupled.

In the above-described configuration, when an upper surface of each of the coupling members is a top side, the first snap fit part corresponds to the first fitting part, and the second snap fit part corresponds to the second fitting part, when the upper surface of each of the coupling members is a ground side, the first snap fit part corresponds to the second fitting part, and the second snap fit part corresponds to the first fitting part, the first snap fit part includes a first block part at a proximal end of the first snap fit part, the second snap fit part includes a second block part at a proximal end of the second snap fit part, and when the upper surface of each of the coupling members is the ground side, the first block part abuts on an entrance of the second fitting part and prevents the first snap fit part from fitting into the second fitting part, and the second block part abuts on an entrance of the first fitting part and prevents the second snap fit part from fitting into the first fitting part.

The first snap fit part is designed such that the first snap fit part can be fitted into the first fitting part, and the second snap fit part is designed such that the second snap fit part can be fitted into the second fitting part. When the coupling member is upside down, the first snap fit part is fitted into the second fitting part, and the second snap fit part is fitted into the first fitting part, then the first snap fit part and the second snap fit part may not be able to be smoothly removed or may not be able to be removed from the second fitting part and the first fitting part, respectively.

With this configuration, when the coupling member is upside down, the first block part prevents the first snap fit part from being fitted into the second fitting part, and the second block part prevents the second snap fit part from being fitted into the first fitting part.

In order to describe the present invention, the present invention has been appropriately and fully described above by means of the embodiment with reference to the drawings, but it should be appreciated that one skilled in the art should be able to modify and/or improve the embodiment described above easily. Therefore, as long as the modification or improvement implemented by one skilled in the art does not depart from the scope of the claims, it is understood that the modification or improvement is included in the scope of the claims.

INDUSTRIAL APPLICABILITY

The present invention can provide a finger guard member for a roller conveyor and a finger guard member coupling structure.

The invention claimed is:

1. A finger guard member for a roller conveyor, the finger guard member comprising:
   a first surface disposed between one end of a roller provided in the roller conveyor and a belt wound around the one end;
   a second surface in which a notch having a width larger than a shaft diameter of a fixed shaft of the roller is formed with respect to the fixed shaft positioned outside the one end in a longitudinal direction of the roller; and
   a positioning part disposed inside the notch,
   wherein when the fixed shaft has a first shaft diameter, the finger guard member is positioned by the positioning part being supported by a peripheral surface of the fixed shaft, and
   when the fixed shaft has a second shaft diameter greater than the first shaft diameter, the finger guard member is positioned by an edge of the notch being supported by the peripheral surface of the fixed shaft with the positioning part being not present on the second surface.

2. The finger guard member according to claim 1, wherein the notch has an arch shape,
   the positioning part includes an arc-shaped part,
   for the first shaft diameter, the finger guard member is positioned by the arc-shaped part being supported by the peripheral surface of the fixed shaft, and
   for the second shaft diameter, the finger guard member is positioned by an edge of a tip portion of the notch being supported by the peripheral surface of the fixed shaft.

3. The finger guard member according to claim 2, wherein
   for the first shaft diameter, the finger guard member is positioned with the fixed shaft being fitted into the arc-shaped part, and
   a distance between both ends of the arc-shaped part is smaller than the first shaft diameter.

4. The finger guard member according to claim 3, wherein the positioning part further includes:
   a first guide part connected to one of the both ends to guide the fixed shaft to the arc-shaped part; and
   a second guide part connected to another of the both ends to guide the fixed shaft to the arc-shaped part, and
   an interval between the first guide part and the second guide part is shortened toward the arc-shaped part.

5. The finger guard member according to claim 1, wherein the positioning part further includes a rib part connected to the edge of the notch.

6. A finger guard member coupling structure comprising:
   a plurality of the finger guard members according to claim 1 arranged in a row; and
   a plurality of coupling members each coupling the adjacent finger guard members.

7. The finger guard member coupling structure according to claim 6, wherein
   one of the adjacent finger guard members includes a first fitting part,
   another of the adjacent finger guard members includes a second fitting part,
   each of the coupling members includes:
   a first snap fit part of a cantilever type including a first hook part and configured to fit into the first fitting part; and a second snap fit part of a cantilever type including a second hook part and configured to fit into the second fitting part, the first snap fit part allows removal from the first fitting part by the first hook part being pushed from above with the first snap fit part being fitted into the first fitting part, and the second snap fit part allows removal from the second fitting part by the second hook part being pushed from above with the second snap fit part being fitted into the second fitting part.

8. The finger guard member coupling structure according to claim 7, wherein when an upper surface of each of the coupling members is a top side, the first snap fit part corresponds to the first fitting part, and the second snap fit part corresponds to the second fitting part, when the upper surface of each of the coupling members is a ground side, the first snap fit part corresponds to the second fitting part, and the second snap fit part corresponds to the first fitting part, the first snap fit part includes a first block part at a proximal end of the first snap fit part, the second snap fit part includes a second block part at a proximal end of the second snap fit part, and when the upper surface of each of the coupling members is the ground side, the first block part abuts on an entrance of the second fitting part and prevents the first snap fit part from fitting into the second fitting part, and the second block part abuts on an entrance of the first fitting part and prevents the second snap fit part from fitting into the first fitting part.

\* \* \* \* \*